(12) United States Patent
Chuang et al.

(10) Patent No.: US 9,576,094 B2
(45) Date of Patent: Feb. 21, 2017

(54) LOGIC CIRCUIT AND SYSTEM AND COMPUTER PROGRAM PRODUCT FOR LOGIC SYNTHESIS

(71) Applicants: TAIWAN SEMICONDUCTOR MANUFACTURING COMPANY, LTD., Hsinchu (TW); NATIONAL TAIWAN UNIVERSITY, Taipei (TW)

(72) Inventors: Chi-Chuan Chuang, Taichung (TW); Yi-Hsiang Lai, Taipei (TW); Jie-Hong Chiang, Taipei (TW)

(73) Assignees: TAIWAN SEMICONDUCTOR MANUFACTURING COMPANY, LTD. (TW); NATIONAL TAIWAN UNIVERSITY (TW)

( * ) Notice: Subject to any disclaimer, the term of this patent is extended or adjusted under 35 U.S.C. 154(b) by 176 days.

(21) Appl. No.: 14/464,366

(22) Filed: Aug. 20, 2014

(65) Prior Publication Data

US 2016/0055270 A1 Feb. 25, 2016

(51) Int. Cl.
*G06F 17/50* (2006.01)
*H03K 19/00* (2006.01)
*H03K 19/04* (2006.01)
*H03K 19/096* (2006.01)
*H03K 19/02* (2006.01)

(52) U.S. Cl.
CPC ......... *G06F 17/505* (2013.01); *G06F 17/5022* (2013.01); *G06F 17/5059* (2013.01); *G06F 17/5045* (2013.01); *G06F 17/5054* (2013.01); *H03K 19/00* (2013.01); *H03K 19/02* (2013.01); *H03K 19/04* (2013.01); *H03K 19/0966* (2013.01)

(58) Field of Classification Search
CPC ...... H03K 19/00; H03K 19/02; H03K 19/094; H03K 19/0966; G06F 17/5045; G06F 17/505; G06F 17/5054
USPC ................................ 326/93–94; 716/100,104
See application file for complete search history.

(56) References Cited

FOREIGN PATENT DOCUMENTS

| EP | 0584265 | 3/1994 |
|----|---------|--------|
| EP | 1121631 | 8/2001 |
| WO | WO 92/21083 | 11/1992 |
| WO | WO 00/05644 | 2/2000 |

OTHER PUBLICATIONS

Mishchenko, Alan, et al., "DAG-Aware AIG Rewriting, A Fresh Look at Combinational Logic Synthesis", Department of EECS, University of California, Berkeley, Berkeley, CA; pp. 1-6.

(Continued)

*Primary Examiner* — Stacy Whitmore
(74) *Attorney, Agent, or Firm* — Hauptman Ham, LLP

(57) ABSTRACT

A logic circuit includes first and second input, an output, an input acknowledgement node, an output acknowledgement node, a logic evaluation block, a pre-charging circuit, and a completion detection circuit. The logic evaluation block performs a logic evaluation of first and second input signals at the first and second inputs, and to output an output signal corresponding to the logic evaluation. The pre-charging circuit pre-charges the logic evaluation block in response to the first input signal and an acknowledgement signal at the input acknowledgement node. The completion detection circuit generates an acknowledgement signal at the output acknowledgement node in response to the second input signal and the output signal.

20 Claims, 16 Drawing Sheets

(56) References Cited

OTHER PUBLICATIONS

Mishchenko, Alan, et al., "Combinational and Sequential Mapping with Priority Cuts", Department of EECS, University of California, Berkeley, Berkeley, CA; pp. 1-8.
Mishchenko, Alan, et al., "DAG-Aware AIG Rewriting, A Fresh Look at Combinational Logic Synthesis", Department of EECS, University of California, Berkeley, Berkeley, CA; 2006; pp. 1-6.
Mishchenko, Alan, et al., "Combinational and Sequential Mapping with Priority Cuts", Department of EECS, University of California, Berkeley, Berkeley, CA; 2007; pp. 1-8.

=

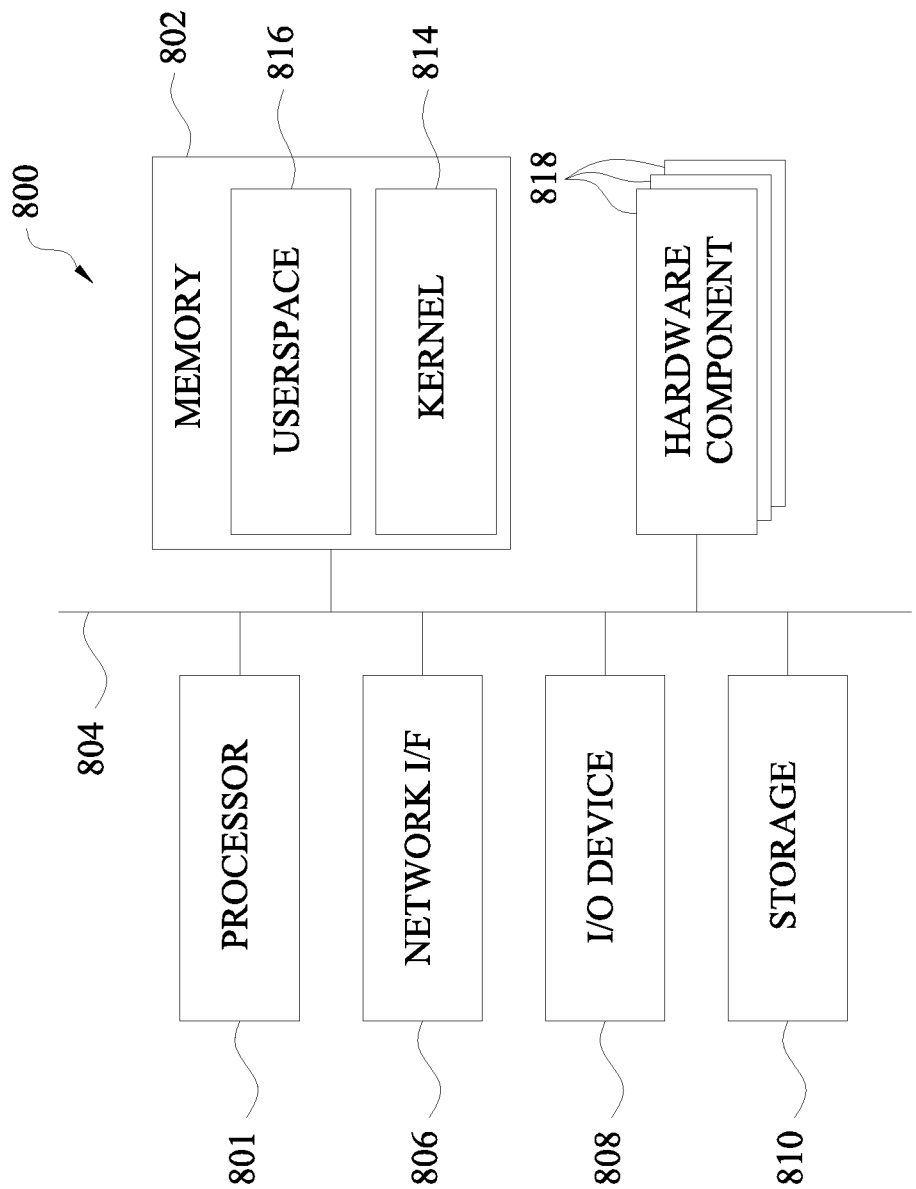

LOGIC CIRCUIT AND SYSTEM AND COMPUTER PROGRAM PRODUCT FOR LOGIC SYNTHESIS

BACKGROUND

The recent trend in miniaturizing integrated circuits (ICs) has resulted in smaller devices which consume less power, yet provide more functionality at higher speeds. The miniaturization process has also resulted in stricter design and manufacturing specifications. Various electronic design automation (EDA) processes are developed to generate, optimize and verify designs for semiconductor devices while ensuring that the design and manufacturing specifications are met. Logic synthesis is one such EDA process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a block diagram of a computer system in accordance with some embodiments.

DETAILED DESCRIPTION

Figure 1:
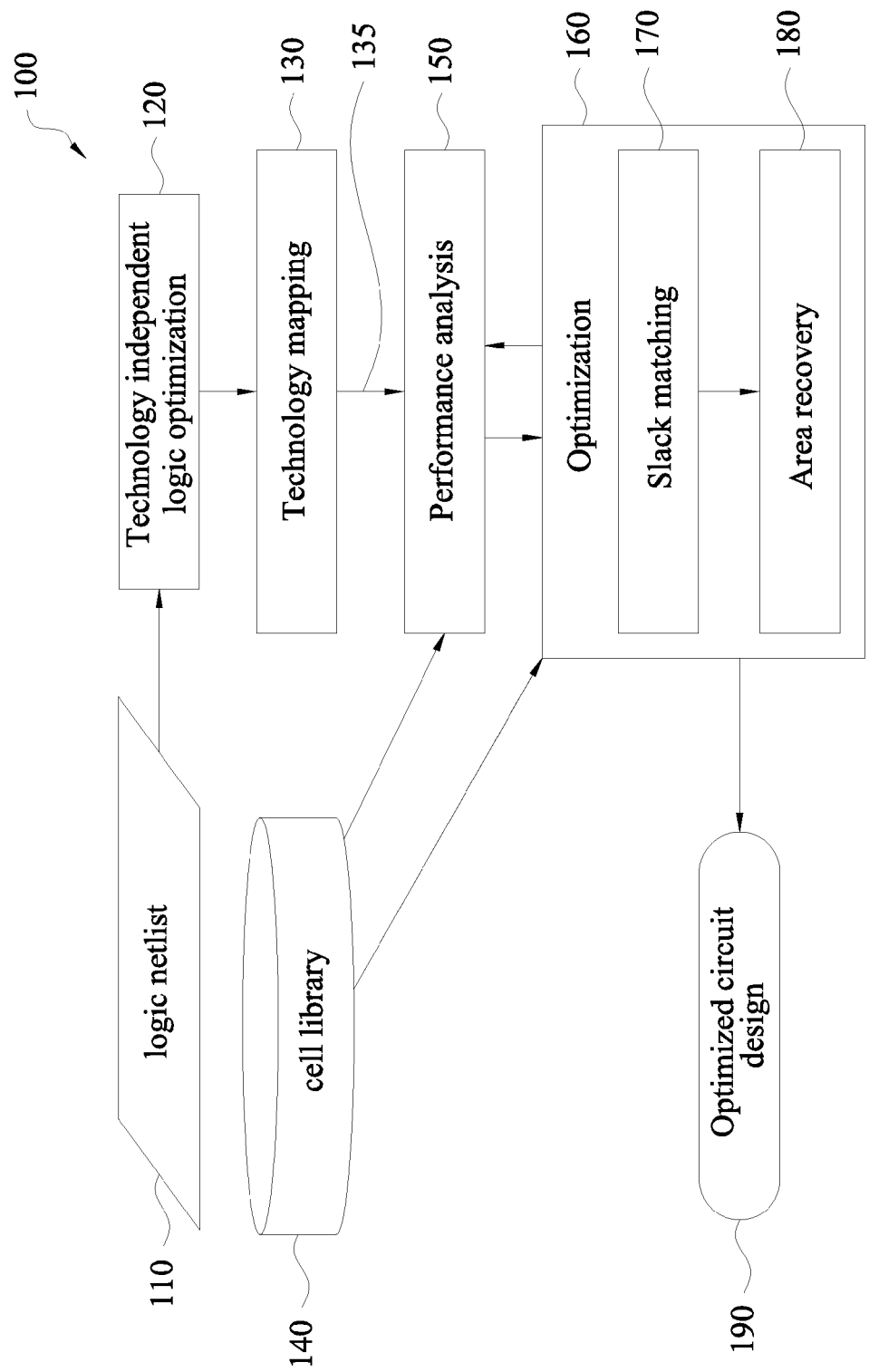
FIG. 1 is a flow chart of a logic synthesis process in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a flow chart of a logic synthesis process 100 in accordance with some embodiments. The logic synthesis process 100 utilizes one or more EDA tools. The EDA tools, in some embodiments, are one or more sets of executable instructions for execution by a processor or controller or a programmed computer to perform the indicated functionality.

A design of a semiconductor device, such as an IC or chip, is provided by a circuit designer in the form of a logic netlist 110. The logic netlist 110 includes a plurality of logic elements interconnected with each other to provide one or more logic functions that the chip is configured to perform. Examples of logic elements include, but are not limited to, AND gates, OR gates, NAND gates, NOR gates, XOR gates, XNOR gates, NOT gates (inverters) and the like, as well as combinations thereof. In at least one embodiment, the logic netlist 110 is a single-rail logic netlist.

The logic netlist 110 is used as an input of a technology-independent logic optimization 120 which is performed to simplify logic expressions and/or structures of the structures of the logic netlist 110. This optimization is performed independently of the technology node that will be used to manufacture the chip. An example of technology-independent logic optimization is described in A. Mishchenko, S. Chatterjee, and R. Brayton. DAG-aware AIG rewriting: A fresh look at combinational logic synthesis. In Proc. Design Automation Conference, pp. 532-535, 2006, which is incorporated by reference herein in its entirety. In at least one embodiment, the technology-independent logic optimization 120 is omitted.

The logic netlist 110 or a technology-independent optimized netlist provided by the technology-independent logic optimization 120 is used as an input for a technology mapping 130. In the description below, the logic netlist 110 and a technology-independent optimized netlist provided by the technology-independent logic optimization 120 are commonly referred to as "the logic netlist."Another input of the technology mapping 130 is a cell library (also referred to as "technology library") 140. The cell library 140 includes a plurality of cells or modules corresponding to logic functions expressed in the logic netlist. In at least one embodiment, for each logic function expressed in the logic netlist, there are more than one corresponding modules in the cell library 140. The corresponding modules are configured to perform the same logic function, but are different in one or more aspects including, but not limited to, design, area cost, power consumption, and performance (speed or delay). The technology mapping 130 is a process for mapping logic elements in the logic netlist to corresponding modules in the cell library 140, based on the logic functions expressed by the logic elements. The result is a technology-mapped design 135 of the chip in the technology node that will be used to manufacture the chip. The design 135 is a network of interconnected nodes in which the mapped modules are arranged at the corresponding nodes of the network. In at least one embodiment, the cell library 140 includes dual-rail modules and the design 135 includes the dual-rail modules mapped onto corresponding single-rail logic elements in the logic netlist.

Examples of one or more modules in the cell library 140 in accordance with some embodiments are described with respect to FIGS. 2A-2D. Examples of one or more techniques for performing the technology mapping in accordance with some embodiments are described with respect to FIGS. 3A, 3B, 3C and 4. Examples of portions of a network of interconnected nodes or modules in accordance with some embodiments are described with respect to FIGS. 5A-5C and 6A-6B.

A performance analysis 150 of the network or design 135 obtained at the technology mapping 130 is conducted to estimate time delays along various paths and/or at various nodes in the network 135. In at least one embodiment, the performance analysis 150 is conducted based on predetermined characteristics of the mapped modules provided from the cell library 140. In at least one embodiment, the performance analysis 150 is implemented as a stand-alone tool and/or performed outside a logic synthesis process. In at least one embodiment, the performance analysis 150 is implemented as an integrated part of the logic synthesis process for iterative and/or incremental interactions with a slack matching operation and/or an area recovery operation in an optimization process 160 as described herein. Such interactions between the performance analysis 150 and the optimization process 160 are by the double arrows illustrated in FIG. 1. Examples of one or more techniques for conducting the performance analysis 150 in accordance with some embodiments are described with respect to FIGS. 5A-5C and 7.

An optimization process (also referred to as "technology-dependent optimization") 160 is performed to optimize the design 135 based on a result of the performance analysis 150, to achieve one or more optimization objectives. Examples of optimization objectives include, but are not limited to, timing, area cost, power consumption, placeability, signal integrity, and the like. In some embodiments, a timing optimization is performed by a slack matching operation 170. For example, at least one module in the cell library 140 is added to the design 135 to optimize a timing characteristic of the design 135, without changing the overall logic functionality of the design 135. In some embodiments, an area cost optimization is performed by an area recovery operation 180. For example, at least one module in the design 135 is replaced with another module in the cell library 140 to optimize an area cost of the design 135, without changing the overall logic functionality of the design 135. In some embodiments, at least one of the slack matching operation 170 or area recovery operation 180 is omitted. An example technique for the slack matching operation 170 in accordance with some embodiments is described with respect to FIG. 6A. An example technique for the area recovery operation 180 in accordance with some embodiments is described with respect to FIG. 6B.

A result of the technology-dependent optimization 160 is an optimized circuit design 190. In subsequent operations in accordance with some embodiments, a physical layout for the optimized circuit design 190 is generated, verified, optimized and manufactured to obtain the designed chip.

Figure 2A:
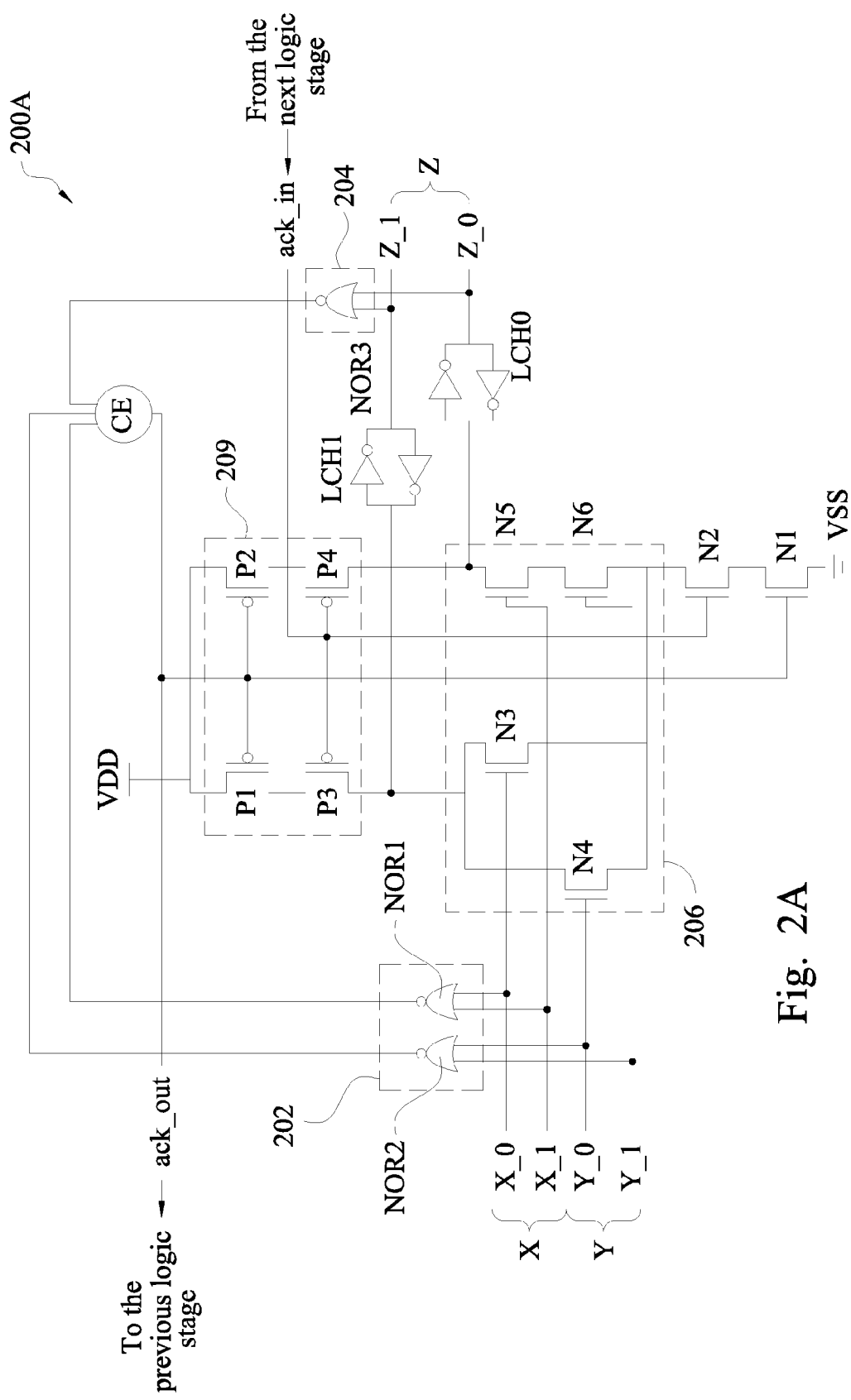
FIGS. 2A-2D are circuit diagrams of various modules in a cell library in accordance with some embodiments.

FIG. 2A is a circuit diagram of a Pre-Charged Half Buffer (PCHB) module 200A in the cell library 140 in accordance with some embodiments. The PCHB module 200A is a dual-rail module. A dual-rail module has two rails for each input or output. For example, PCHB module 200A has two inputs X and Y and an output Z. Each of input X, input Y and output Z has two rails. Specifically, input X has a first rail X_0 and a second rail X_1, input Y has a first rail Y_0 and a second rail Y_1, and output Z has a first rail Z_0 and a second rail Z_1. An input or an output is in a DATA state if one of the corresponding rails has logical "0." For example, input X has two DATA states, namely, DATA 0 when X_0=1 and X_1=0, and DATA 1 when X_0=0 and X_1=1. An input or an output is in a NULL state if both of the corresponding rails have logical "0." For example, input X is in a NULL state when X_0=0 and X_1=0. The number of inputs of the PCHB module 200A, i.e., two inputs, is an example. Other numbers of inputs for each module in the cell library 140 are within the scope of various embodiments. In at least one embodiment, to reduce the amount of computation workload involved in the electronic design automation (EDA) processes, the maximum number of inputs of each module is capped at 4, i.e., each module has 1, 2, 3 or 4 inputs.

The PCHB module 200A further includes an input completion detector 202, an output completion detector 204, a logic evaluation block 206, a pre-charging circuit 209, an input acknowledgement node ack_in, and an output acknowledgement node ack_out. In the following description, a node and a corresponding signal on the node are commonly referred to using the node name. For example, "X_0" is used interchangeably herein to denote both the first rail of the input X and also the signal or a logic state of that rail.

The input completion detector 202 is coupled to the input X and input Y. In the example configuration shown in FIG. 2A, the input completion detector 202 includes two NOR gates NOR1 and NOR2. Inputs of NOR1 are coupled to the corresponding rails of the input X. Inputs of NOR2 are coupled to the corresponding rails of the input Y. Outputs of NOR1 and NOR2 are coupled to first and second inputs of a C-gate or C-element CE. The described configuration of the input completion detector 202 is an example. Other configurations of the input completion detector 202 are within the scope of various embodiments.

The output completion detector 204 is coupled to the output Z. In the example configuration shown in FIG. 2A, the output completion detector 204 includes a NOR gate NOR3. Inputs of NOR3 are coupled to the corresponding rails of the output Z. An output of NOR3 is coupled to a third input of CE. An output of CE is coupled to ack_out. The described configuration of the output completion detector 204 is an example. Other configurations of the output completion detector 204 are within the scope of various embodiments.

CE is configured to switch its output when all the inputs match. For example, when all inputs of CE have logical "0," ack_out at the output of CE has logical "0." CE maintains ack_out at logical "0" until all inputs of CE have logical "1," at which time, CE switches ack_out to logical "1." Other configurations for generating ack_out are within the scope of various embodiments.

The logic evaluation block 206 is configured to perform a logic function (also referred to herein as "logic evaluation") of input signals at the input X and input Y, and to output an output signal corresponding to a result of the logic evaluation at the output Z. The onset of output Z is a logic function over inputs X and Y that results in Z being in DATA 1. The offset of output Z is a logic function over inputs X and Y that results in Z being in DATA 0. The onset part of the logic evaluation block 206 contains transistors N3, N4 that implement the onset function, and the offset part of the logic evaluation block 206 contains transistors N5, N6 that implement the offset function. Signal-wise, the logic evaluation block 206 is coupled to the input X and input Y on one side, and coupled to the output Z on the other side. Power-wise, the logic evaluation block 206 is coupled to a first power supply voltage VDD and the pre-charging circuit 209 on one side, and to a second power supply voltage VSS on the other side.

In the example configuration shown in FIG. 2A, the logic evaluation block 206 is configured to perform a NAND2 (2-input NAND) logic function, and includes four transistors N3-N6. Drains of N3 and N4 are coupled to Z_1 via a latch LCH1. Sources of N3 and N4 are coupled to VSS via serially-connected transistors N1 and N2. A gate of N3 is coupled to X_0. A gate of N4 is coupled to Y_0. A drain of N5 is coupled to Z_0 via a latch LCH0. A source of N5 is coupled to a drain of N6. A Source of N6 is coupled to VSS via serially-connected N1 and N2. A gate of N5 is coupled to X_1. A gate of N6 is coupled to Y_1. N3 defines a logic state of the logic evaluation block 206 and is referred to as an onset transistor of the logic evaluation block 206, i.e., after N1 and N2 are turned ON by ack_out and ack_in, respectively, Z_1=1 when N3 is turned ON by X_0=1. Another onset transistor is N4, which defines a logic state of the logic evaluation block 206, i.e., Z_1=1 when N4 is turned ON by Y_0=1. A further pair of offset transistors is the string of N5 and N6, which defines a logic state of the logic evaluation block 206, i.e., Z_0=1 when N5 and N6 are turned ON by X_1=1 and Y_1=1. N3 and N4 define DATA 1 of the output Z and determine the onset of the logic evaluation block 206. The string of N5 and N6 defines DATA 0 of the output Z, and determines the offset of the logic evaluation block 206. The described logic function and/or configuration of the logic evaluation block 206 is an example. Other configurations and/or logic functions of the logic evaluation block 206 are within the scope of various embodiments.

The pre-charging circuit 209 is configured to pre-charge the logic evaluation block 206 in response to ack_out and ack_in. Considering the PCHB module 200A as a current logic stage, ack_out of the current logic stage is coupled to ack_in of a previous logic stage, and ack_in of the current logic stage is coupled to ack_out of a next logic stage. The output Z of the current logic stage is coupled to an input of the next logic stage, and the output of the previous logic stage is coupled to one of the inputs X and Y of the current logic stage. In the example configuration shown in FIG. 2A, the pre-charging circuit 209 includes four transistors P1-P4. P1 and P3 are serially connected between VDD and the drains of N3 and N4. P2 and P4 are serially connected between VDD and the drain of N5. Gates of P1 and P2 are coupled to ack_out and to a gate of N1. Gates of P3 and P4 are coupled to ack_in and to a gate of N2. The described configuration of the pre-charging circuit 209 is an example. Other configurations of the pre-charging circuit 209 are within the scope of various embodiments. In some embodiments, transistors with names beginning with "P" are p-channel metal-oxide semiconductor (PMOS) transistors, transistors with names beginning with "N" are n-channel metal-oxide semiconductor (NMOS) transistors, and other logic gates such as NOR1-NOR3, LCH1-LCH2 and CE are implemented with PMOS and/or NMOS transistors. Other type of transistors are within the scope of various embodiments.

The operation of the PCHB module 200A in accordance with some embodiments is described below. In a previous logic evaluation, the inputs X and Y were both in DATA states and output Z was in a DATA state. The input completion detector 202 and output completion detector 204 outputted logical "0," corresponding to the DATA states of the input X, input Y and output Z, to the inputs of CE which switched ack_out to logical "0." CE maintains ack_out at logical "0" until all the input X, input Y and output Z have NULL states. The signal ack_out=0 is sent to ack_in of the previous logic stage, indicating that the current logic stage has completed its logic evaluation and enabling the previous logic stage to pre-charge. In the current logic stage, ack_out=0 turns ON P1 and P2, and turns OFF N1. The pre-charging circuit 209 waits for ack_in from the next logic stage before begin pre-charging the logic evaluation block 206.

After the next logic stage has completed its logic evaluation, the next logic stage pulls ack_in of the current logic stage to logical "0" which turns ON P3 and P4, and turns OFF N2. The logic evaluation block 206 is isolated from VSS and pre-charged from VDD via turned ON P1-P4 of the pre-charging circuit 209. When the logic evaluation block 206 is pre-charged via the pre-charging circuit 209, both Z_0 and Z_1 are at logical "0" corresponding to a NULL state of the output Z. When both inputs X and Y are at NULL states, the input completion detector 202 and output completion detector 204 output logical "1," corresponding to the NULL states of the input X, input Y and output Z, to the inputs of CE which switches ack_out to logical "1." As a result, P1 and P2 are turned OFF and N1 is turned ON. The signal ack_out=1 is sent to ack_in of the previous logic stage, indicating that the current logic stage has completed its pre-charging and enabling the previous logic stage to perform its logic evaluation. When ack_in goes high (meaning the next logic stage is already pre-charged), P3 and P4 turned OFF and N2 is turned ON. The logic evaluation block 206 is isolated from VDD and connected to VSS via turned ON N1 and N2. The current logic stage enters an evaluation phase during which the logic evaluation block 206 performs a logic evaluation of the input signals at the input X and input Y, and outputs a corresponding output signal to the output Z. When the logic evaluation block 206 completes the logic evaluation, CE switches ack_out to logical "0" as described herein.

In the described operation, the PCHB module 200A does not evaluate (i.e., perform a logic evaluation) until all inputs and the output are in NULL states (i.e., pre-charged), and does not pre-charge until all inputs and the output are in DATA states (i.e., evaluated). The described operation is an example. Other arrangements are within the scope of various embodiments. For example, the PCHB module 200A is configured in at least one embodiment to take advantage of input control values for early function valuation, i.e., when any one of the input X or input Y of the NAND2 function has DATA 0, the output Z is determined to be DATA 1 even if the other input is in a NULL state.

Figure 2B:
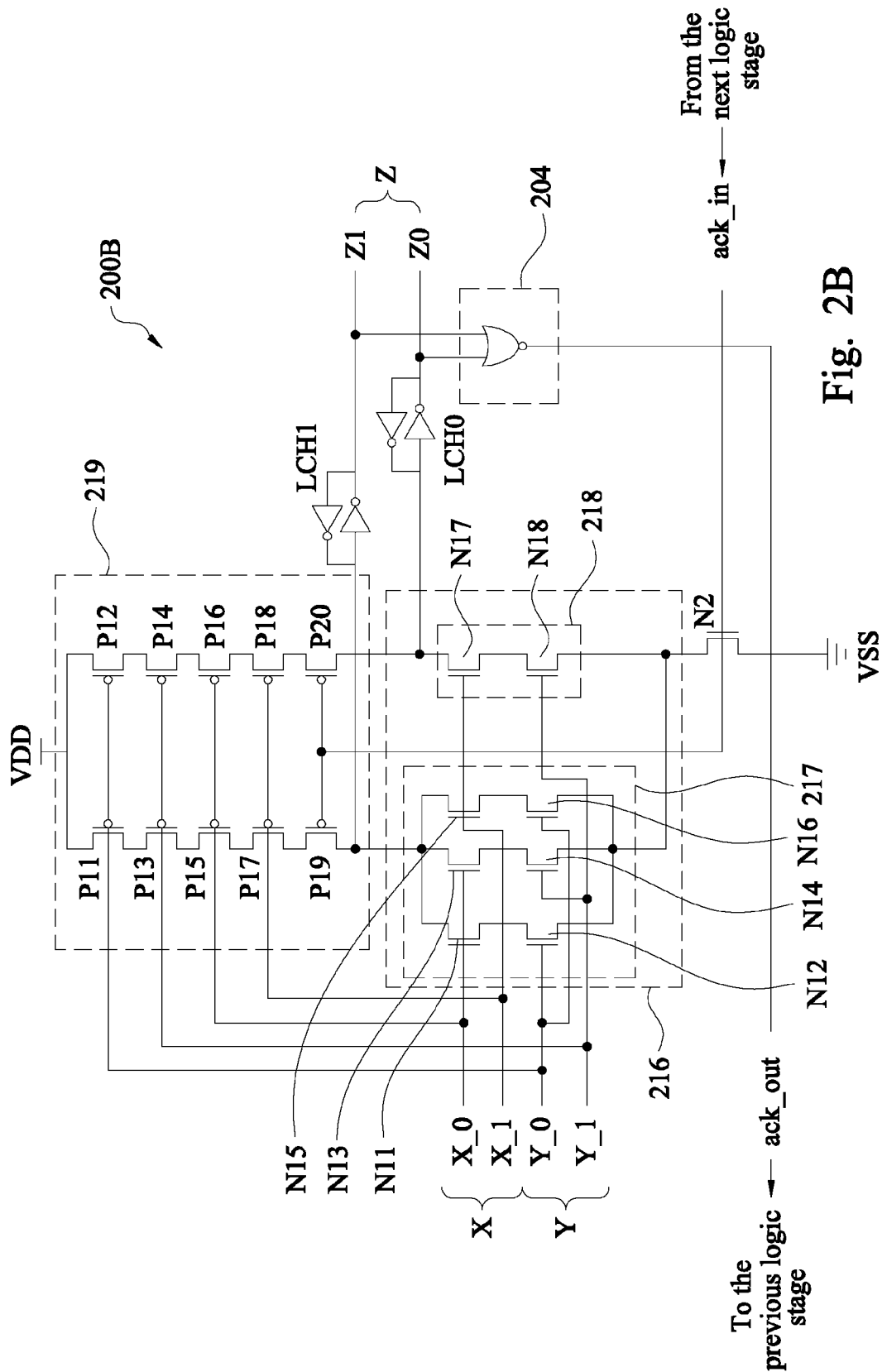

FIG. 2B is a circuit diagram of a Weak Conditioned Half Buffer (WCHB) module 200B in the cell library 140 in accordance with some embodiments. The WCHB module 200B is a dual-rail module. The WCHB module 200B includes a logic evaluation block 216 corresponding to the logic evaluation block 206 and including a minterm onset 217 and a minterm offset 218. A minterm is a product term (a conjunction of literals) that involves all inputs, i.e., inputs X and Y in FIG. 2B. In some embodiments, a minterm is implemented by a string of transistors which is connected to one of the dual-rail signals of each input. That is, (i) at least one of X_0 or X_1 and (ii) at least one of Y_0 or Y_1 are connected to the string of transistors. The WCHB module 200B further includes a charging circuit 219 corresponding to the pre-charging circuit 209. Compared to the PCHB module 200A, the input completion detector 202 and CE are omitted from the WCHB module 200B, and the output completion detector 204 is retained.

In the example configuration shown in FIG. 2B, the logic evaluation block 216 is configured to perform a NAND2 (2-input NAND) logic function which is the same logic function of the logic evaluation block 206 in the PCHB module 200A. The NAND2 logic function is realized by the minterm onset 217 and the minterm offset 218. The minterm onset 217 includes three minterms. A first minterm defined by transistors N11, N12 serially connected between Z_1 (via LCH1) and VSS (via N2), a second minterm defined by transistors N13, N14 serially connected between Z_1 (via LCH1) and VSS (via N2), and a third minterm defined by transistors N15, N16 serially connected between Z_1 (via LCH1) and VSS (via N2). The minterm offset 218 includes one minterm defined by transistors N17, N18 serially connected between Z_0 (via LCH0) and VSS (via N2). Gates of N11 and N13 are coupled to X_0, gates of N15 and N17 are coupled to X_1, gates of N12 and N16 are coupled to Y_0, and gates of N14 and N18 are coupled to Y_1. The described logic function and/or configuration of the logic evaluation block 216 is an example. Other configurations and/or logic functions of the logic evaluation block 216 are within the scope of various embodiments.

The charging circuit 219 includes two strings of serially connected transistors. A first string includes transistors P11, P13, P15, P17, and P19 serially connected between VDD and the minterm onset 217. A second string includes transistors P12, P14, P16, P18, and P20 serially connected between VDD and the minterm offset 218. Gates of P11 and P12 are coupled to Y_0, gates of P13 and P14 are coupled to Y_1, gates of P15 and P16 are coupled to X_0, gates of P17 and P18 are coupled to X_1, and gates of P19 and P20 are coupled to a gate of N2 and ack_in. The described configuration of the charging circuit 219 is an example. Other configurations of the charging circuit 219 are within the scope of various embodiments.

The operation of the WCHB module 200B in accordance with some embodiments is described below. As a result of a previous logic evaluation, the output Z is in a DATA state and the output completion detector 204 switches ack_out to logical "0." The signal ack_out=0 is sent to ack_in of the previous logic stage, indicating that the current logic stage has completed its logic evaluation and enabling the previous logic stage to charge. The charging circuit 219 waits for ack_in from the next logic stage before begin charging the logic evaluation block 216.

After the next logic stage has completed its logic evaluation, the next logic stage pulls ack_in of the current logic stage to logical "0" which turns ON P19 and P20, and turns OFF N2. When both inputs X and Y are at NULL states, P11-P18 of the charging circuit 219 are turned ON and logic evaluation block 216 is charged from VDD, via the turned ON transistors of the charging circuit 219. When the logic evaluation block 216 is charged, both Z_0 and Z_1 are at logical "0" corresponding to a NULL state of the output Z which switches ack_out to logical "1." The signal ack_out=1 is sent to ack_in of the previous logic stage, indicating that the current logic stage has completed its charging and enabling the previous logic stage to perform its logic evaluation.

When ack_in goes high (meaning the next logic stage is already charged), P19 and P20 are turned OFF and N2 is turned ON. The logic evaluation block 216 is isolated from VDD and connected to VSS via turned ON N2. The current logic stage enters an evaluation phase during which the logic evaluation block 216 performs a logic evaluation of the input signals at the input X and input Y, and outputs a corresponding output signal to the output Z. When the logic evaluation block 216 completes the logic evaluation, the output Z is at a DATA state which switches ack_out to logical "0" as described herein.

Compared to the PCHB module 200A, the WCHB module 200B does not pre-charge, because the logic evaluation block 216 is not charged until all inputs are in the NULL state. In the PCHB module 200A, the logic evaluation block 206 is charged (i.e., pre-charged) without waiting for all inputs being in the NULL state. Because the PCHB module includes pre-charging and/or due to the long transistor strings in the charging circuit 219 of the WCHB module 200B, a processing speed of the PCHB module 200A is faster than that of the WCHB module 200B. In contrast, the WCHB module 200B has a lower area cost and, therefore, is cheaper to make than the PCHB module 200A. In the example configurations specifically shown in FIGS. 2A-2B, WCHB module 200B saves up to 13 transistors compared to the PCHB module 200A. When a PCHB module and a WCHB module, which are configured to perform the same logic function, are included in the cell library 140, one or more operations of the logic synthesis process 100, including, but not limited to, the technology mapping 130, the slack matching operation 170 and the area recovery operation 180, considers one module over the other depending on the current optimization objectives. To increase the flexibility of the logic synthesis process 100, some embodiments provide a hybrid module that is smaller than the corresponding PCHB module and faster than the corresponding WCHB module configured to perform the same logic function.

Figure 2C:
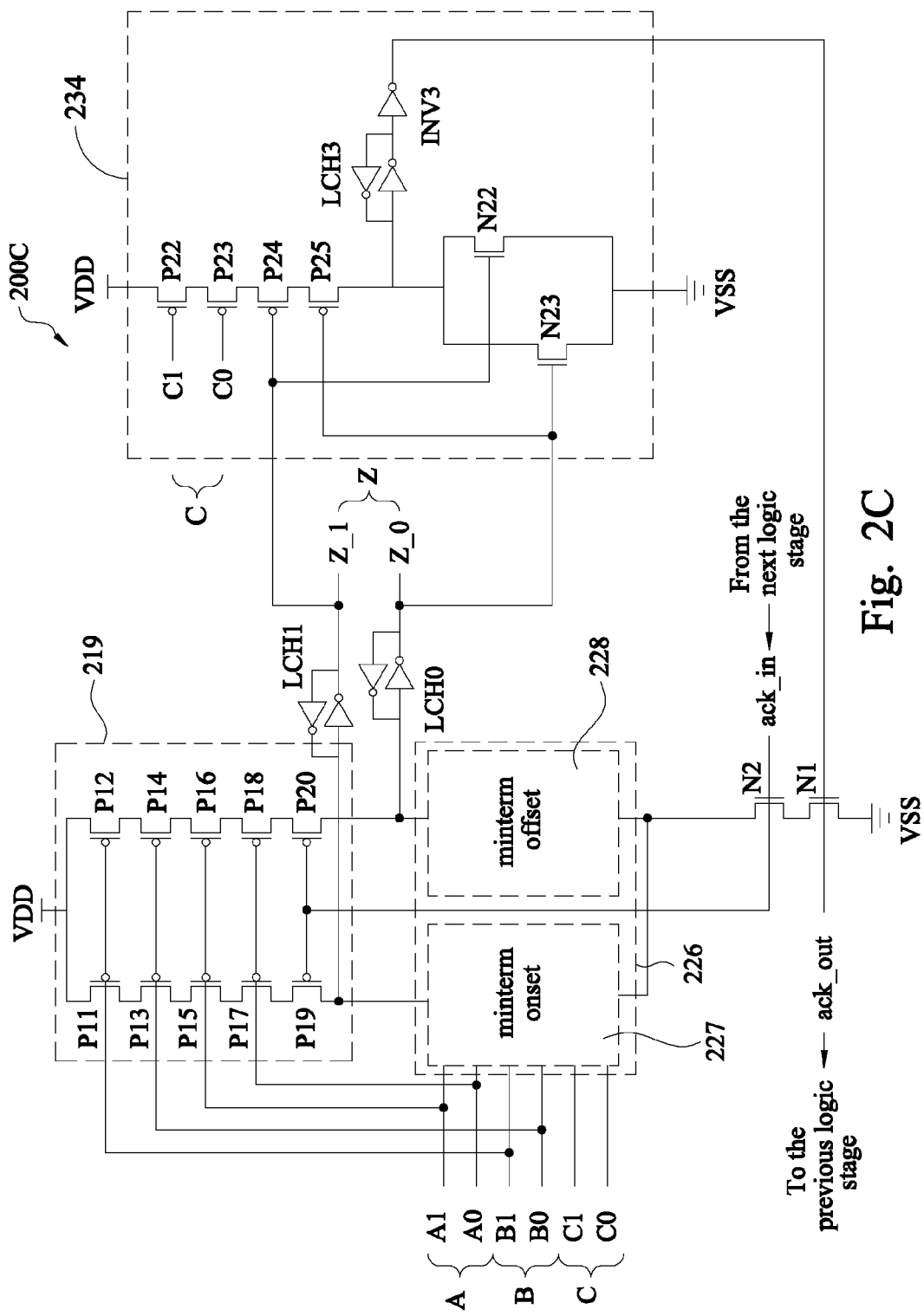

FIG. 2C is a circuit diagram of a hybrid module 200C in the cell library 140 in accordance with some embodiments. The hybrid module 200C includes three dual-rail inputs A, B and C with the corresponding rails A0, A1, B0, B1, C0, and C1. The hybrid module 200C further includes a logic evaluation block 226 containing a minterm onset 227 and a minterm offset 228, and a completion detection circuit 234.

The logic evaluation block 226 are coupled to the inputs A, B and C to perform a logic evaluation of the input signals at the inputs A, B and C, and output a corresponding output signal at the output Z. At least one, but not all, of the inputs of the hybrid module 200C is coupled to the charging circuit 219 which now functions as a pre-charging circuit as described herein. In the example configuration in FIG. 2C, the inputs A and B are coupled to the charging circuit 219 in the same manner in which the inputs X and Y of the WCHB module 200B are coupled to the charging circuit 219. At least one, but not all, of the inputs of the hybrid module 200C is coupled to the completion detection circuit 234. In the example configuration in FIG. 2C, the input C is coupled to the completion detection circuit 234. The described numbers of inputs coupled to the charging circuit 219 and the completion detection circuit 234 are examples. Other arrangements are within the scope of various embodiments. In at least one embodiment, the cell library 140 includes hybrid modules with at least 3 inputs, and no hybrid module with less than 3 inputs. In at least one embodiment, the maximum number of inputs of each module in the cell library 140 is capped at 4, and hybrid modules with 3 or 4 inputs are included in the cell library 140. The charging circuit 219, the logic evaluation block 226, the inputs A, B and the output Z are coupled to define a WCHB circuit as described with respect to FIG. 2B, but with partial pre-charge completion detection as described herein.

The completion detection circuit 234 includes a string of serially connected transistors P22, P23, P24 and P25, a latch LCH3, an inverter INV3, and transistors N22, N23. A first end of the transistor string is coupled to VDD. A second, opposite end of the transistor string is coupled to ack_out via LCH3 and INV3. A gate of P22 is coupled to the first rail C1 of the input C, a gate of P23 is coupled to the second rail C0 of the input C, a gate of P24 is coupled to the first rail Z_1 of the output Z, and a gate of P25 is coupled to the second Z_0 of the output Z. N22 and N23 are coupled in parallel between the second end of the transistor string and VSS. A gate of N22 is coupled to the first rail Z_1 of the output Z, and a gate of N23 is coupled to the second Z_0 of the output Z. The described configuration of the completion detection circuit 234 is an example. Other configurations of the completion detection circuit 234 are within the scope of various embodiments.

The operation of the hybrid module 200C in accordance with some embodiments is described below. As a result of a previous logic evaluation, the output Z is in a DATA state, meaning one of the Z_1 or Z_0 is at logical "1."For example, Z_1 is at logical "1."N22 is turned ON by Z_1=1, and applies VSS to ack_out via LCH3 and INV3. As a result, ack_out has logical "0."The signal ack_out=0 is sent to ack_in of the previous logic stage, indicating that the current logic stage has completed its logic evaluation and enabling the previous logic stage to charge. The charging circuit 219 waits for ack_in from the next logic stage before begin charging the logic evaluation block 226.

After the next logic stage has completed its logic evaluation, the next logic stage pulls ack_in of the current logic stage to logical "0"which turns ON P19 and P20, and turns OFF N2. When both inputs A and B are at NULL states, P11-P18 of the charging circuit 219 are turned ON and logic evaluation block 226 is charged from VDD, via the turned ON transistors of the charging circuit 219. When the logic evaluation block 226 is charged, both Z_0 and Z_1 are at logical "0"corresponding to a NULL state of the output Z which turn OFF N22, N23, and turn ON P24, P25. When the input C is at a NULL state, P22 and P23 of the completion detection circuit 234 are turned ON. VDD is applied via turned ON P22-P25, LCH3 and INV3 to ack_out, switches ack_out to logical "1"and turns ON N1. The signal ack_out=1 is sent to ack_in of the previous logic stage, indicating that the current logic stage has completed its charging and enabling the previous logic stage to perform its logic evaluation.

When ack_in goes high (meaning the next logic stage is already charged), the current logic stage enters an evaluation phase as described with respect to FIG. 2B. When the logic evaluation block 226 completes the logic evaluation, the output Z is at a DATA state which switches ack_out to logical "0"as described herein.

Compared to a 3-input WCHB module configured to perform the same logic function, the hybrid module 200C has shorter transistor strings in the charging circuit 219. A 3-input WCHB module would additionally include two more transistors in each of the two transistor strings of the charging circuit 219, for a total of 7 transistors per string. Because the hybrid module 200C has a shorter transistor strings, the charging time of the hybrid module 200C is shorter and the hybrid module 200C has a higher speed than the corresponding WCHB module. In addition, the charging circuit 219 charges the logic evaluation block 226 irrespective of the input signal at the input C. In some situations where the input signal at the input C is the latest among the inputs A-C, the charging circuit 219 is effectively a pre-charging circuit that pre-charges the logic evaluation block 226 as soon as input signals appear on the inputs A and B, without waiting for the input signal to appear at the input C. This pre-charging further improves the speed of the hybrid module 200C over the corresponding WCHB module.

Compared to a 3-input PCHB module configured to perform the same logic function, the hybrid module 200C has a smaller area. In the specific configuration illustrated in FIG. 2C, the hybrid module 200C saves up to 10 transistors compared to the corresponding PCHB module. The area saving is available by the completion detection circuit 234 which is simpler and smaller than the corresponding CE and output completion detector 204 of the corresponding PCHB module. Another factor contributing to the area saving feature of the hybrid module 200C is that, like the corresponding WCHB module, the hybrid module 200C does not include an input completion detector 202 as in the corresponding WCHB module.

Figure 2D:
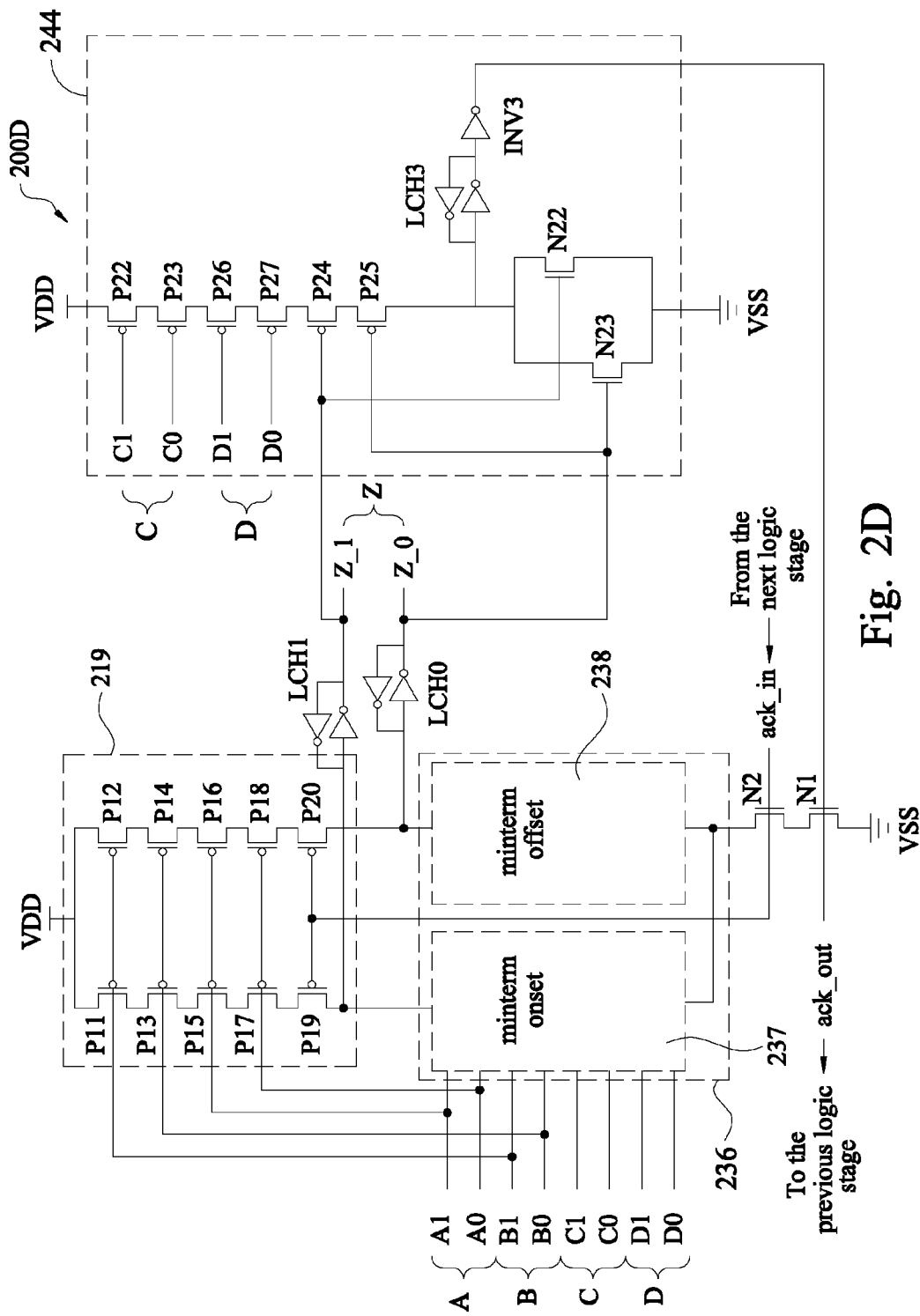

FIG. 2D is a circuit diagram of a hybrid module 200D in the cell library 140 in accordance with some embodiments. The hybrid module 200D includes four dual-rail inputs A, B, C and D. Compared to the hybrid module 200C, the hybrid module 200D has a different logic evaluation block 236 with minterm onset 237 and minterm offset 238, and a completion detection circuit 244 with two addition transistors P26, P27 in the transistor string. Gates of P26, P27 are coupled to rails D1, D0 of the additional input D. The operation of the hybrid module 200D is similar to that of the hybrid module 200C.

Compared to a 4-input WCHB module configured to perform the same logic function, the hybrid module 200D has shorter transistor strings in the charging circuit 219. A 4-input WCHB module would additionally include four more transistors in each of the two transistor strings of the charging circuit 219, for a total of 9 transistors per string. The pre-charging effect of the charging circuit 219 is also obtained in the hybrid module 200D. Compared to a 4-input PCHB module configured to perform the same logic function, the hybrid module 200D has a smaller area. In the specific configuration illustrated in FIG. 2D, the hybrid module 200D saves up to 14 transistors compared to the corresponding PCHB module.

PCHB modules, WCHB modules and hybrid modules, in accordance with some embodiments, are asynchronous, quasi-delay-insensitive (QDI) modules. The described inclusion of PCHB modules, WCHB modules and hybrid modules in the cell library 140 is an example. Other arrangements are within the scope of various embodiments. For example, in at least one embodiment, the cell library 140 includes one or more other QDI modules, such as Delay Insensitive Minterm Synthesis (DIMS) modules and NULL Convention Logic (NCL) modules. In at least one embodiment, dual-rail modules other than QDI modules are included in the cell library 140. Hybrid modules in accordance with some embodiments take advantage of high performance of PCHB modules and low area cost of WCHB modules. In at least one embodiment, the hybrid modules provide additional flexibility and/or enhanced optimization capability to the logic synthesis process 100. In at least one embodiment, the area overhead of QDI asynchronous circuits is reduced, which, in turn, alleviates the performance and power overheads.

As discussed with respect to FIG. 1, the cell library 140 and a logic netlist are inputs for the technology mapping 130. An example technology mapping includes computing k-feasible cuts for each node in the logic netlist, deriving a corresponding Boolean function of the node, performing a table-lookup (TLU) to find a module in a cell library corresponding to the derived Boolean function, selecting a set of cuts to cover all nodes in the logic netlist, and optimizing the cut selection with respect to one or more optimization objectives. A particular example of technology mapping is described in A. Mishchenko, S. Cho, S. Chatterjee, and R. Brayton. Combinational and sequential mapping with priority cuts. In Proc. Int'l Conf. on Computer-Aided Design, pp. 354-361, 2007, which is incorporated by reference herein in its entirety.

In some embodiments, the technology mapping 130 includes considering one or more satisfiability-don't-care (SDC) conditions of a Boolean function derived for a node in the logic netlist.

Figure 3A:
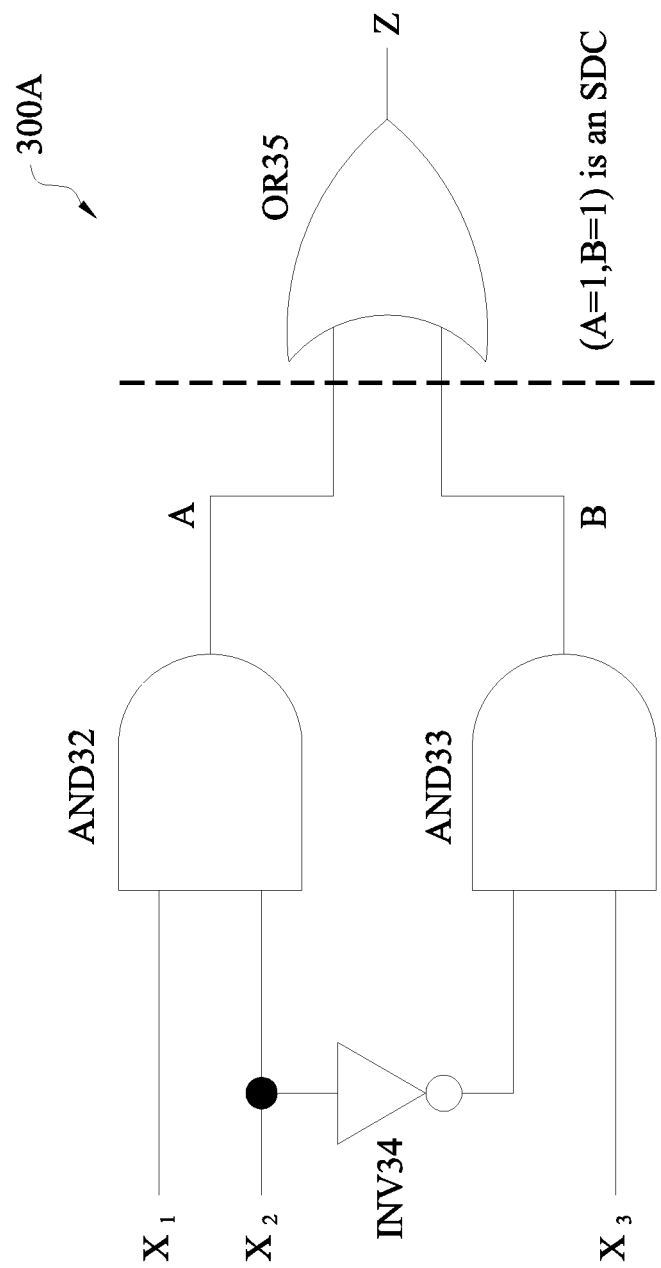
FIG. 3A is a schematic diagram of logic elements in a section of a logic netlist.
Figure 3B:
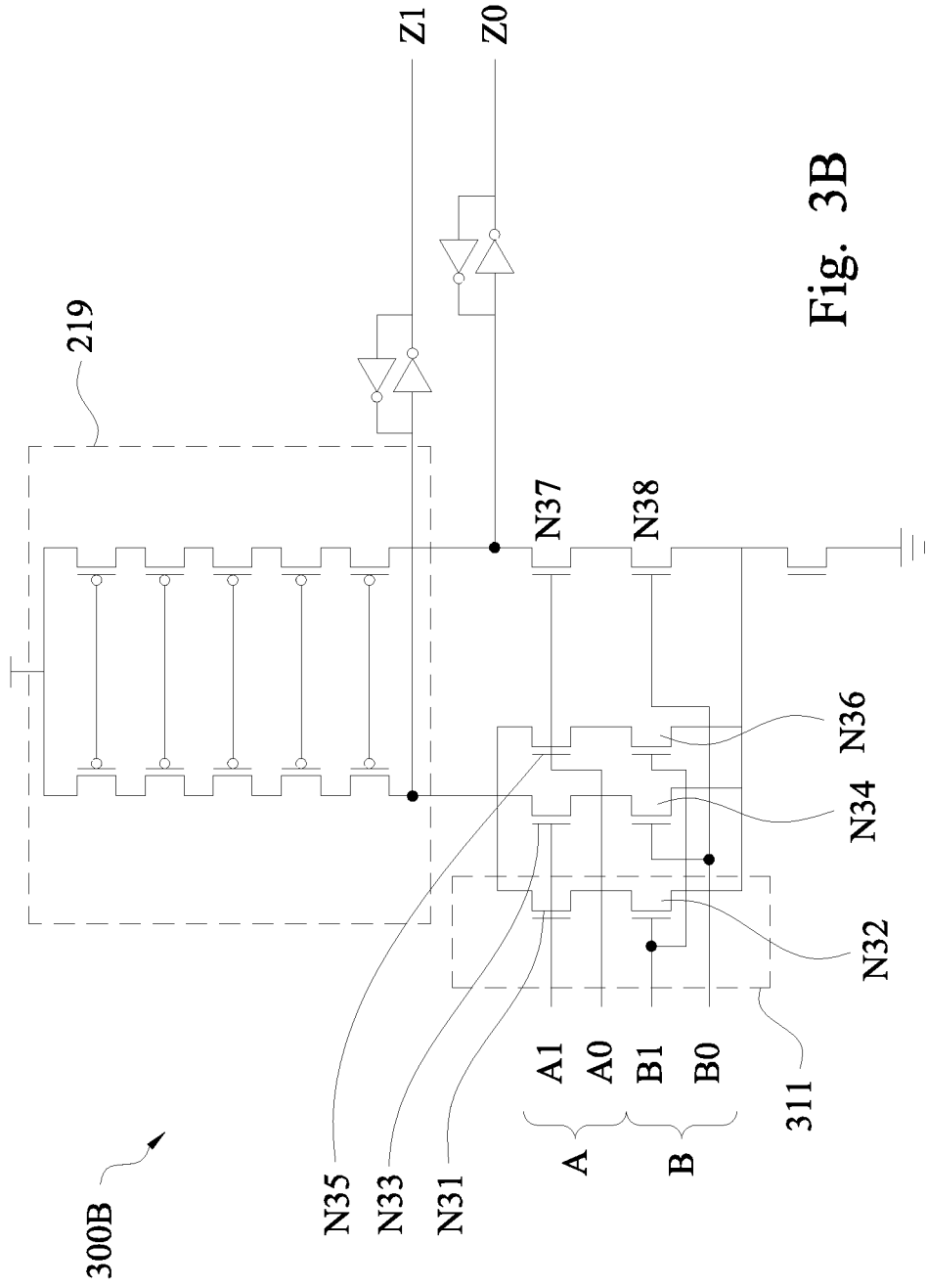
FIG. 3B is a circuit diagram of a module corresponding to a logic element in the section of FIG. 3A.
Figure 3C:
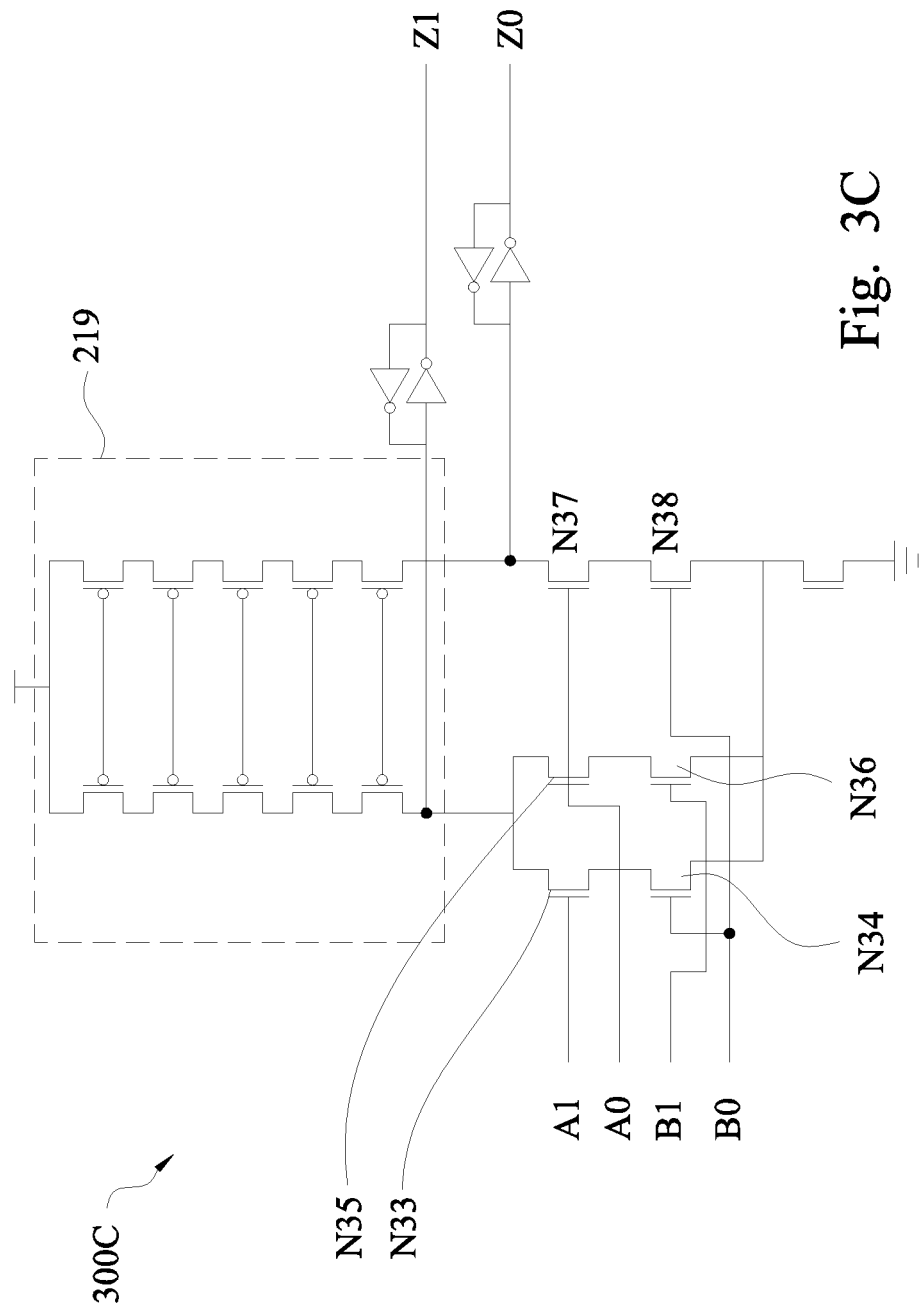
FIG. 3C is a circuit diagram of a modified module of the module in FIG. 3B.

FIG. 3A is a schematic diagram of logic elements in a section 300A of a logic netlist. FIG. 3B is a circuit diagram of a WCHB module 300B corresponding to a logic element in the section 300A. FIG. 3C is a circuit diagram of a modified WCHB module 300C obtained from the WCHB module 300B upon considering an SDC condition.

As shown in FIG. 3A, the section 300A includes AND gates AND32, AND33, an inverter INV34 and an OR gate OR35. Input signals X1 and X2 are supplied to first and second inputs of AND32. An output A of AND32 is supplied to a first input of OR35. The input signal X2 is supplied to an input of INV34. An inverter output of INV34 is supplied to a first input of AND33. An input signal X3 is supplied to a second input of AND33. An output B of AND33 is supplied to a second input of OR35. The output of OR35 is denoted as Z. In the section 300A, A and B cannot be at logical "1" at the same time, because if X2 is at logical "1", then the corresponding input of AND33 is at logical "0" which causes B to be at logical "0." If X2 is at logical "0", then the corresponding input of AND32 is at logical "0" which causes A to be at logical "0." (A=1, B=1) is infeasible. For OR35, (A=1, B=1) is an SDC. Such an SDC condition is considered during the technology mapping 130 in accordance with some embodiments.

The logic function, i.e., the OR function, of OR35, which is a node in the logic netlist, is derived from the logic netlist. A TLU is performed to map OR35 to a module configured to perform the OR function in the cell library 140. For example, the cell library 140 includes three modules corresponding to the OR function, namely a PCHB module, a WCHB module, and a hybrid module. When the optimization objective is timing, the module having the best performance among the available modules is selected. As a result, the OR35 is mapped to the WCHB module which is shown in FIG. 3B as 300B.

As shown in FIG. 3B, the WCHB module 300B includes a minterm onset and a minterm offset configured to realize the OR function. Specifically, the minterm onset includes three minterms, namely, a first minterm 311 defined by transistors N31, N32 corresponding to (A=1, B=1), a second minterm defined by transistors N33, N34 corresponding to (A=1, B=0), and a third minterm defined by transistors N35, N36 corresponding to (A=0, B=1). The minterm offset includes a fourth minterm defined by transistors N37, N38 corresponding to (A=0, B=0). In at least one embodiment, one or more SDC conditions of OR35 are considered as described herein, and it is determined that (A=1, B=1) is an SDC and that the first minterm 311 defined by N31, N32 corresponding to (A=1, B=1) is removable.

As shown in FIG. 3C, the first minterm 311 corresponding to SDC (A=1, B=1), also referred to herein as SDC minterm 311, is removed from the WCHB module 300B to obtain the modified PCHB module 300C. As a result the design of the chip is simplified which improves one or more optimization objectives, such as of performance, area cost and power consumption.

The described example illustrates a situation wherein the minterm onset is modified based on one or more SDC conditions without modifying the minterm offset. In at least one embodiment, the minterm offset is modified based on one or more SDC conditions without modifying the minterm onset. In some embodiments, both minterm onset and minterm offset are modified based on one or more SDC conditions, and the minterm onset is modified independently of the minterm offset, and vice versa. In at least one embodiment, an SDC minterm is added to a mapped module obtained from the cell library 140 to achieve or approach one or more optimization objectives. In at least one embodiment, the set of SDC conditions is empty. In at least one embodiment, a modification of an onset or offset includes adding at least one minterm to the onset or offset being modified. In at least one embodiment, a modification of an onset or offset includes removing at least one minterm from and adding at least another one minterm to the onset or offset being modified.

Figure 4:
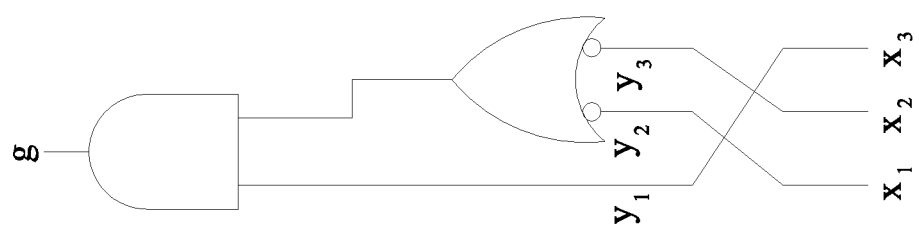
FIG. 4 includes schematic diagrams of two NP-equivalent functions.
Figure 4:
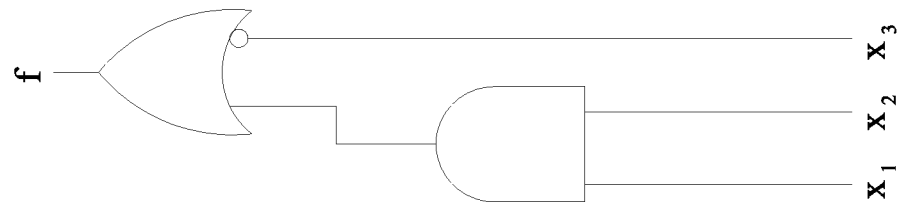

In some embodiments, the technology mapping 130 includes considering NP-equivalence of a Boolean function derived for a node in the logic netlist. NP-equivalence of a Boolean function includes a set of functions which are equivalent to the Boolean function and which differ from each other by negation of at least one of the inputs and/or permutation of at least one of the inputs. FIG. 4 includes schematic diagrams of two NP-equivalent functions f and g. In some embodiments, the technology mapping 130 considers both SDC conditions and NP-equivalence.

NP-equivalence is different from NPN-equivalence. NPN-equivalence of a Boolean function includes a set of functions which are equivalent to the Boolean function and which differ from each other by negation of at least one of the inputs and/or permutation of at least one of the inputs and/or negation of the output. NPN-equivalence is broader than NP-equivalence. In at least one embodiment, the technology mapping 130 includes considering NP-equivalence, but not NPN-equivalence, of a Boolean function derived for a node in the logic netlist. A reason for not considering NPN-equivalence is that dual-rail modules in at least one embodiment already include information of a negated output, i.e., Z_0 is the negated output of Z_1.

By considering NP-equivalence in accordance with some embodiments, the number of modules to be included in the cell library 140 is greatly reduced. For example, instead of including every function in an NP-equivalence set in the cell library 140, it is sufficient to include one representative function. When another function in the NP-equivalence set is derived from the logic netlist, the representative function is retrieved from the cell library 140 and one or more inputs of the representative function is negated and/or permutated to match the function derived from the logic netlist. In at least one embodiment, when a new type of modules, such as the hybrid modules described herein, is to be added to the cell library 140, it is sufficient to add one hybrid module for a representative function of an NP-equivalence set, instead of adding a new hybrid module for every possible function.

As discussed with respect to FIG. 1, after the technology mapping 130 is completed, a network of interconnected nodes is obtained, and a performance analysis 150 is conducted for the obtained network.

Figure 5A:
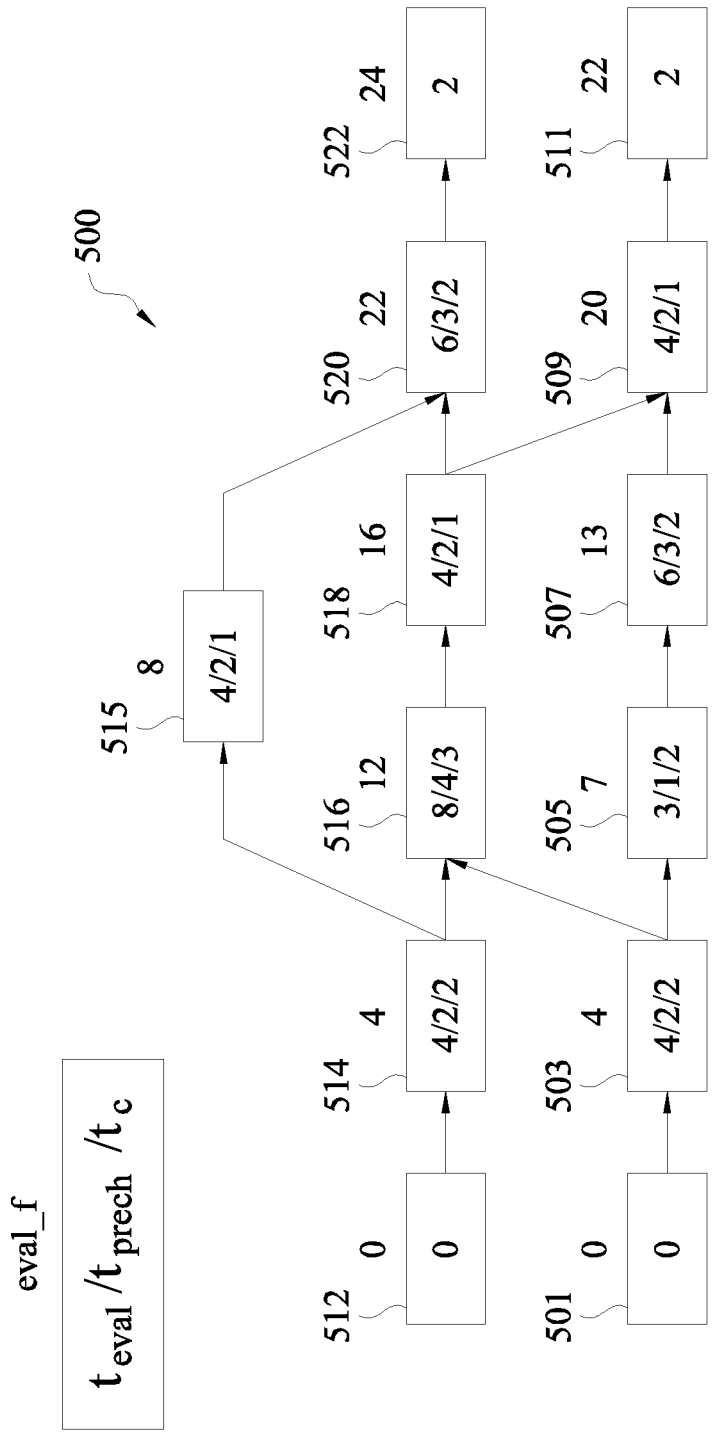
FIGS. 5A-5C are schematic diagrams of a pipeline in a performance analysis in accordance with some embodiments.
Figure 5B:
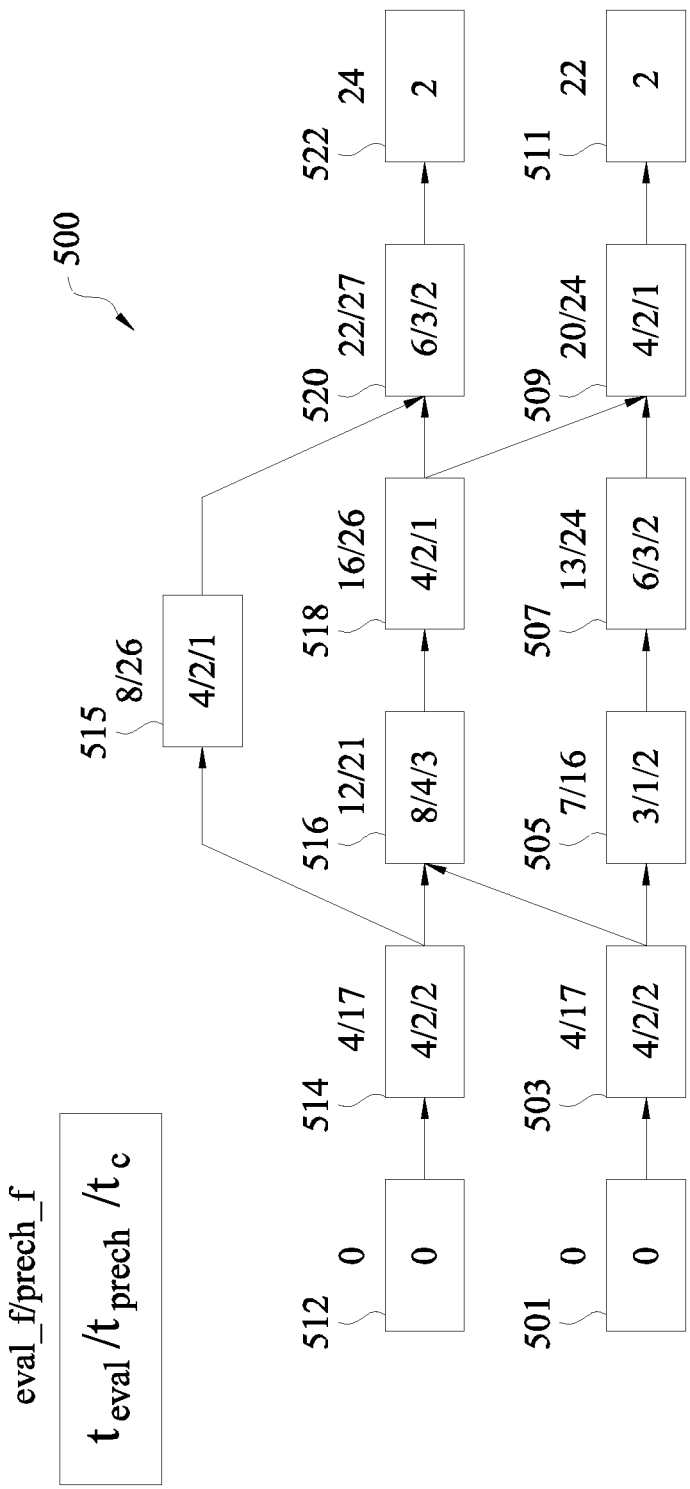
Figure 5C:
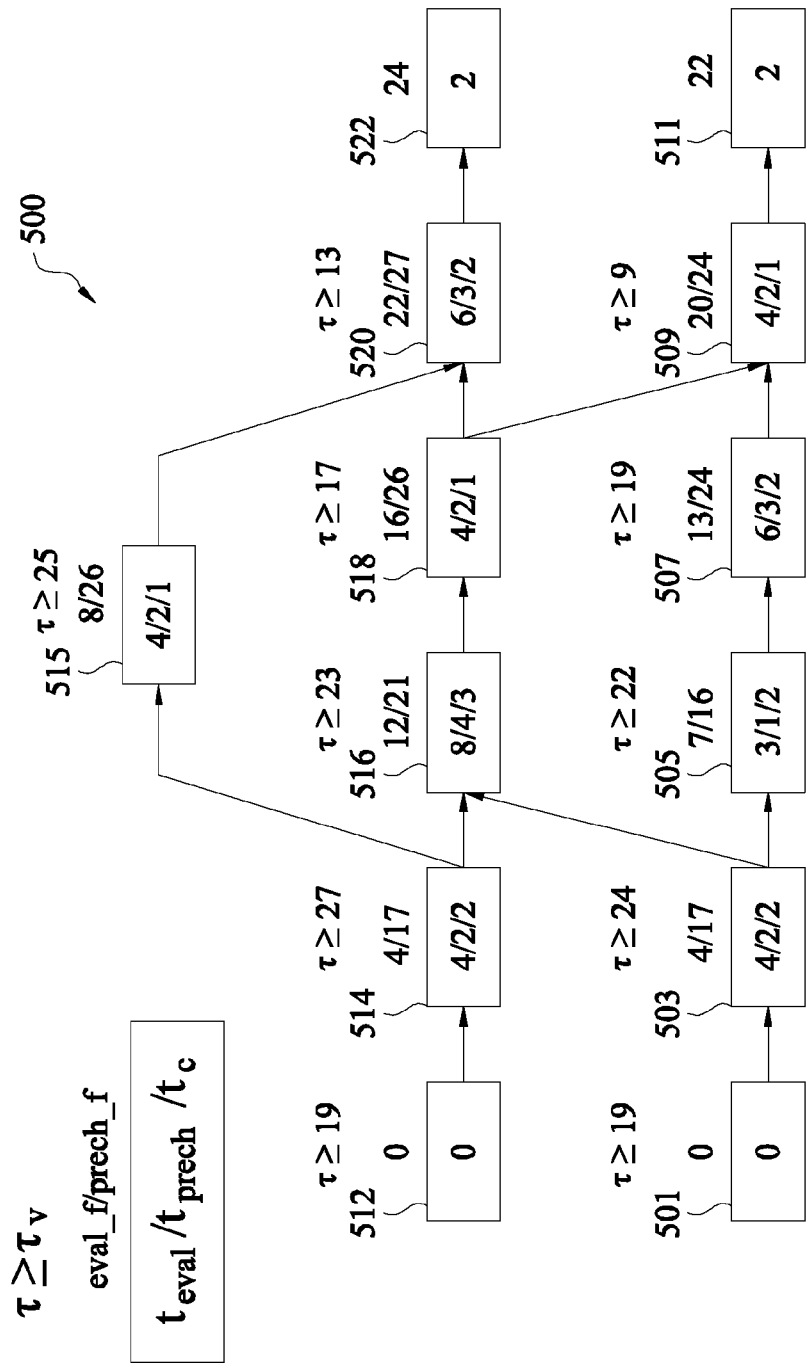

FIGS. 5A-5C are schematic diagrams of a pipeline 500 in a network obtained from the technology mapping 130, in accordance with some embodiments. As shown in FIG. 5A, the pipeline 500 includes a plurality of nodes 501, 503, 505, 507, 509, 511, 512, 514, 515, 516, 518, 520, and 522 interconnected with each other in the form of a delay graph. Each of the nodes represents a mapped module retrieved in the technology mapping 130 from the cell library 140 in accordance with a logic function derived from the logic netlist. The arrows among the nodes indicate the flow of signals along the pipeline 500. Although the arrows indicate one-way flows of information, acknowledgement signals are sent, in at least one embodiment, in the opposite direction as described herein with respect to FIGS. 2A-2D. For example, when node 515 is considered a current logic stage, acknowledgement signals are sent in the direction opposite to the arrows associated with node 515 from ack_out of node 515 to ack_in of node 514 (previous logic stage) and from ack_out of node 520 (next logic stage) to ack_in of node 515. The described arrangement of data signals travelling in the forward direction of the arrows, and acknowledgement signals traveling in the direction opposite to the arrows is referred to as four-phase, and the pipeline 500 is referred to as a four-phase pipeline.

A node having the output coupled to an input of another node is a fanin node of the other node. For example, node 514 is a fanin node of node 515, and node 515 is a fanin node of node 520. A node having an input coupled to the output of another node is a fanout node of the other node. For example, node 515 is a fanout node of node 514, and node 520 is a fanout node of node 515. Nodes 501, 512 have no fanin nodes and are referred to as primary inputs. Nodes 511, 522 have no fanout nodes and are referred to as primary outputs.

In the following description, for simplicity, all nodes in the pipeline 500 include PCHB modules which, with their high performance and in accordance with some embodiments, are the first choices during the technology mapping 130 in order to achieve or approach timing optimization for the chip. As described herein, when the optimization objective is not timing and/or when a PCHB module corresponding to a retrieved logic function is not available, a module of another type, such as a hybrid module or a WCHB module, is included in the pipeline 500. In some embodiments, the pipeline 500 includes a mix of various modules. In some embodiments, the pipeline 500 includes at least one QDI module other than a PCHB, WCHB or hybrid module, and/or at least one non-QDI module.

The numbers inside and above each node correspond to the legends at the top left corner of FIG. 5A. For example, timing parameters of the module at each node are provided inside the node. The timing parameters are predetermined and stored in the cell library 140, and are retrieved from the cell library 140 for conducting the performance analysis 150. The timing parameters for each node include an evaluation time parameter $t_{eval}$, a pre-charging time parameter $t_{prech}$, and an acknowledge output time parameter $t_c$. The parameter $t_{eval}$ indicates how long it takes to complete a logic evaluation at the node. For example, for a node where the module PCHB module 200A is arranged, $t_{eval}$ is determined by the configuration of the onset and the offset of the logic evaluation block 206. The parameter $t_{prech}$ indicates how long it takes to complete charging (e.g., for a WCHB module) or precharging (e.g., for a hybrid or PCHB module) at the node. For example, for a node where the module PCHB module 200A is arranged, $t_{prech}$ is determined by the configuration of the pre-charging circuit 209. The parameter $t_c$ indicates how long it takes to output an acknowledge signal after the logic evaluation is completed. For example, for a node where the module PCHB module 200A is arranged, $t_c$ is determined by the configuration of the output completion detector 204 and CE. In a specific example in the pipeline 500, node 515 has $t_{eval}$ of 4, $t_{prech}$ of 2, and $t_c$ of 1. The single numbers in the primary inputs, i.e., nodes 501, 512 and primary outputs, i.e., nodes 511, 522, are the corresponding evaluation time parameters $t_{eval}$ of nodes 501, 512 and 511, 522, respectively.

In some situations, the timing parameters do not sufficiently accurately reflect the actual time to finish each of the tasks, i.e., logic evaluation, charging/pre-charging, when the module is included in a pipeline or network. The performance analysis 150 is conducted to provide a more accurate estimate of the actual time to finish each task in the pipeline 500.

As shown in FIG. 5A, an evaluation finish time eval_f is calculated and indicated on top of each node. For example, the calculated eval_f for node 515 is 8. The evaluation finish time eval_f indicates the finish time of logic evaluation at each node when other nodes in the pipeline 500 are taken into account. In at least one embodiment, v.eval_f of each node v with a PCHB module is calculated by the following equation:

$$v.\text{eval}\_f = \max_{u \in FI(v)}\{u.\text{eval}\_f\} + v.t_{eval} \qquad (1)$$

where
FI(v) indicates a set of fanin nodes of node v,
u.eval_f eval_f is the evaluation finish time of node u,
$\max_{u \in FI(v)}\{u.\text{eval}\_f\}$ is the maximum of u.eval_f among the fanin nodes of node v, and
$v.t_{eval}$ is the evaluation time parameter $t_{eval}$ of node v.
In at least one embodiment, v.eval_f of each node v with a WCHB module is calculated by the same equation (1).

As shown in FIG. 5B, a pre-charging finish time prech_f is calculated and indicated on top of each node, on the right side of the previously calculated eval_f. For example, for node 515, the calculated eval_f is 8, and the calculated prech_f is 26. The pre-charging finish time prech_f indicates the finish time of precharging/charging at each node when other nodes in the pipeline 500 are taken into account. In at least one embodiment, v.prech_f of each node v with a PCHB module is calculated by the following equation:

$$v.\text{prech}\_f = \max\{\max_{u \in FO(v)}\{u.\text{eval}\_f + u.t_c\}, \max_{u \in FI(v)}\{u.\text{eval}\_f\}v.t_c, v.\text{eval}\_f + v.t_c\} + v.t_{prech} \qquad (2)$$

where
FO(v) indicates a set of fanout nodes of node v,
$u.t_c$ is the acknowledge output time parameter of node u,
$\max_{u \in FO(v)}\{u.\text{eval}\_f + u.t_c\}$ is the maximum of (u.eval_f+ u.t_c) among the fanout nodes of node v,
FI(v) indicates a set of fanin nodes of node v,
$\max_{u \in FI(v)}\{u.\text{eval}\_f\}$ is the maximum of (u.eval_f) among the fanin nodes of node v,
$v.t_c$ is the acknowledge output time parameter of node v,
v.eval_f is the evaluation finish time of node v,
$\max\{\max_{u \in FO(v)}\{u.\text{eval}\_f + u.t_c\}, \max_{u \in FI(v)}\{u.\text{eval}\_f\} + v.t_c, v.\text{eval}\_f + v.t_c\}$ is the maximum of $\max_{u \in FO(v)}\{u.\text{eval}\_f + u.t_c\}$, $\max_{u \in FI(v)}\{u.\text{eval}\_f\} + v.t_c$, and v.eval_f+v.t_c, and
$v.t_{prech}$ is the pre-charging time parameter $t_{prech}$ of node v.
In at least one embodiment, v.prech_f of each node v with a WCHB module is calculated by the following equation:

$$v.\text{prech}\_f = \max\{\max_{u \in FO(v)}\{u.\text{eval}\_f + u.t_c\}, \max_{u \in FI(v)}\{u.\text{prech}\_f\}\} + v.t_{prech} \qquad (3)$$

where
u.prech_f is the pre-charging finish time of node u, and
$\max_{u \in FI(v)}\{u.\text{prech}\_f\}$ is the maximum of (u.prech_f) among the fanin nodes of node v.

As shown in FIG. 5C, a cycle time t of each node v is calculated and indicated on top of each node, above the previously calculated v.eval_f and v.prech_f. For example, for node 515, the calculated $\tau_v$ is 25. In FIG. 5C, t indicates the overall cycle time of the pipeline 500. The relationship $\tau > \tau_v$ indicates that the overall cycle time t of the pipeline 500 is not less than the cycle time of each node in the pipeline 500. The cycle time t of each node indicates how long a next data has to wait before it enters node v. The overall cycle time t of the pipeline 500 indicates how long the next data have to wait before they enter the pipeline. In at least one embodiment, t of each node v with a PCHB module is calculated by the following equation:

$$\tau \geq \tau_v = \max\{\max_{u \in FO(v)}\{u.\text{prech\_f} + u.t_c\}, v.\text{prech\_f} + v.t_c\} - \max_{u \in FI(v)}\{u.\text{eval\_f}\} \quad (4)$$

where $\max_{u \in FO(v)} \{u.\text{prech\_f} + u.t_c\}$ is the maximum of $(u.\text{prech\_f} + u.t_c)$ among the fanout nodes of node v.

In at least one embodiment, t of each node v with a WCHB module (or a hybrid module as described herein in accordance with some embodiments) is calculated by the following equation:

$$\tau \geq \tau_v = \max\{\max_{u \in FO(v)}\{u.\text{prech\_f} + u.t_c\}, v.\text{prech\_f} + v.t_c\} - \max_{u \in FI(v)}\{u.\text{eval\_f}\} \quad (5)$$

As shown in FIG. 5C, the performance analysis 150 calculates the cycle time of each node in the pipeline 500. The maximum cycle time is 27 at node 514. In at least one embodiment, the maximum cycle time of all nodes is also the overall cycle time t of the pipeline 500. In at least one embodiment, the maximum cycle time of 27 at node 514 indicates that node 514 is a critical node. In at least one embodiment, a node is considered a critical node when its cycle time is greater than a predetermined threshold, such as a time constraint included in the logic netlist.

The described technique for the performance analysis 150 is an example. Other arrangements are within the scope of various embodiments. For example, one or more equations other than equations (1)-(5) are used in some embodiments to calculate time delays in the pipeline 500. In some embodiments, the performance analysis 150 is a static analysis of the pipeline 500 which is fast and cost effective, compared to other expensive dynamic analysis and/or linear programming-based solving.

As discussed with respect to FIG. 1, after the performance analysis 150 is completed, the design is optimized in the technology-dependent optimization 160, using the result of the performance analysis 150.

Figure 6A:
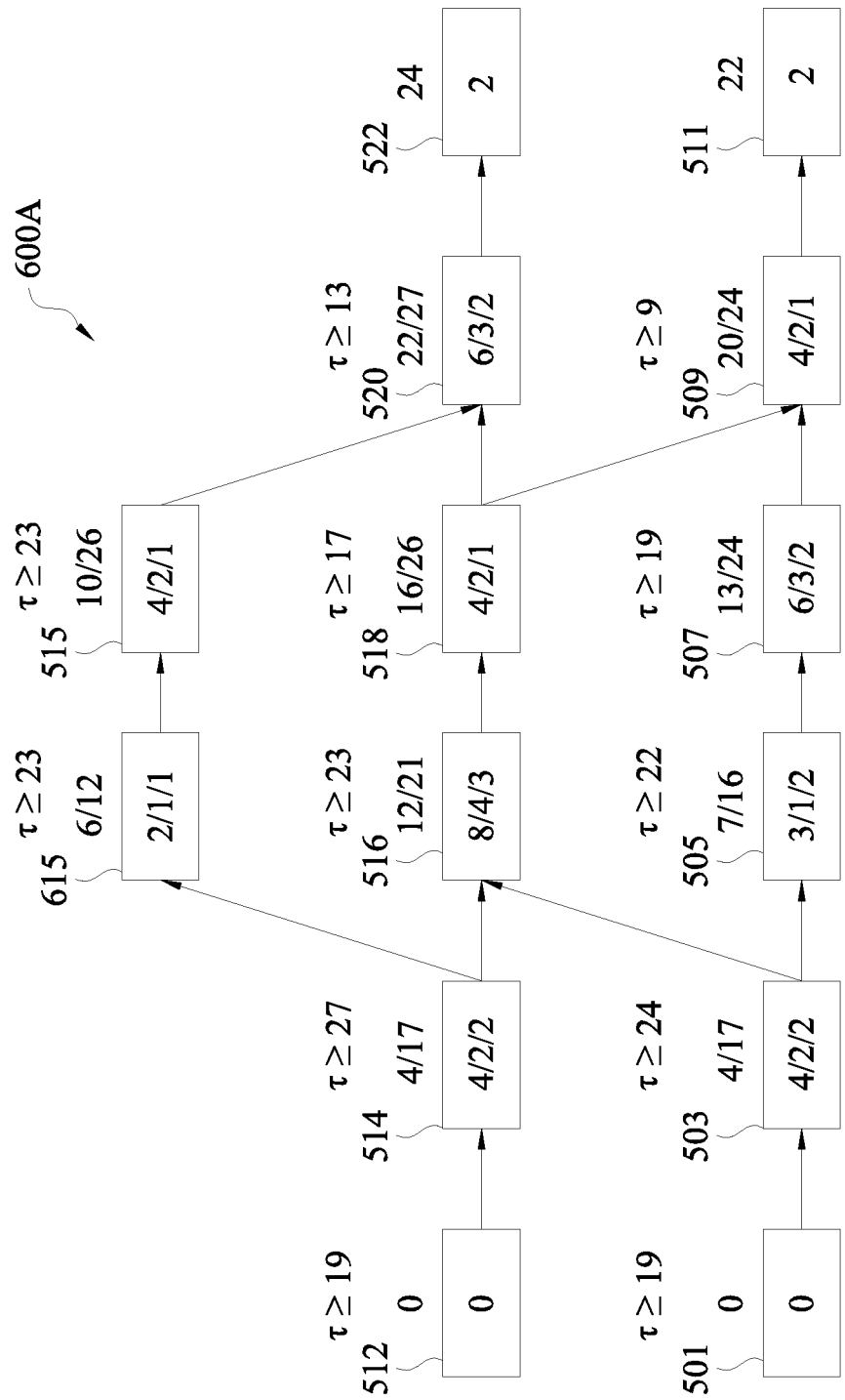
FIGS. 6A-6B are schematic diagrams of a pipeline in a technology-dependent optimization, in accordance with some embodiments.

FIG. 6A is a schematic diagrams of a pipeline 600A obtained by performing a slack matching operation 170 (FIG. 1) on the pipeline 500, in accordance with some embodiments. The slack matching operation 170 utilizes the result of the performance analysis 150. As discussed with respect to FIG. 5C, node 514 is determined as a critical node based on the high cycle time of node 514. From the critical node 514, there are two fanout paths, namely, an upper path via node 515 and a middle path via node 516 and node 518. The upper path is more critical than the middle path, because the maximum cycle time of nodes along the upper path, i.e., the cycle time of 25 at node 515, is higher than the maximum cycle time of nodes along the middle path, i.e., the cycle time of 23 at node 516. For timing optimization, a buffer 615 is inserted in the more critical fanout path, i.e., the upper path via node 515. Such buffer insertion is referred to herein as slack matching.

The buffer 615 is a module selected from the cell library 140 to have no function or a function that does not affect the overall logic function of the pipeline. In at least one embodiment, buffer 615 is an inverter. Given that the nodes in the pipeline include dual-rail modules, the insertion of an inverter/buffer 615 involves an insignificant change to the pipeline, for example, a mere flip of rails at the input connected to the output of the inverter/buffer 615. In at least one embodiment, buffer 615 includes a WCHB module for area-cost saving.

After the insertion of buffer 615, a performance analysis is re-executed for the modified pipeline, in a manner similar to that discussed with respect to FIGS. 5A-5C. In some embodiments, the performance analysis is re-executed not for the whole pipeline, but for a segment including the inserted buffer. For example, performance analysis is re-executed for the signal path through nodes 512, 514, 615, 515, 520, 522. The re-executed performance analysis provides updated cycle times, in accordance with which, the cycle time of previously critical node 514 is reduced from 27 to 24, and the cycle time of node 515 on the critical fanout path is reduced from 25 to 23. The overall cycle time of the pipeline is also reduced from 27 to 24. As a result timing performance of the design is improved. In situations where the updated cycle times are still not satisfactory, e.g., higher than a timing constraint, one or more further buffers are inserted around the critical node until a timing requirement or constraint is met or other stopping criteria are satisfied. The described buffer insertion is an example. Other optimization techniques are within the scope of various embodiments.

Figure 6B:
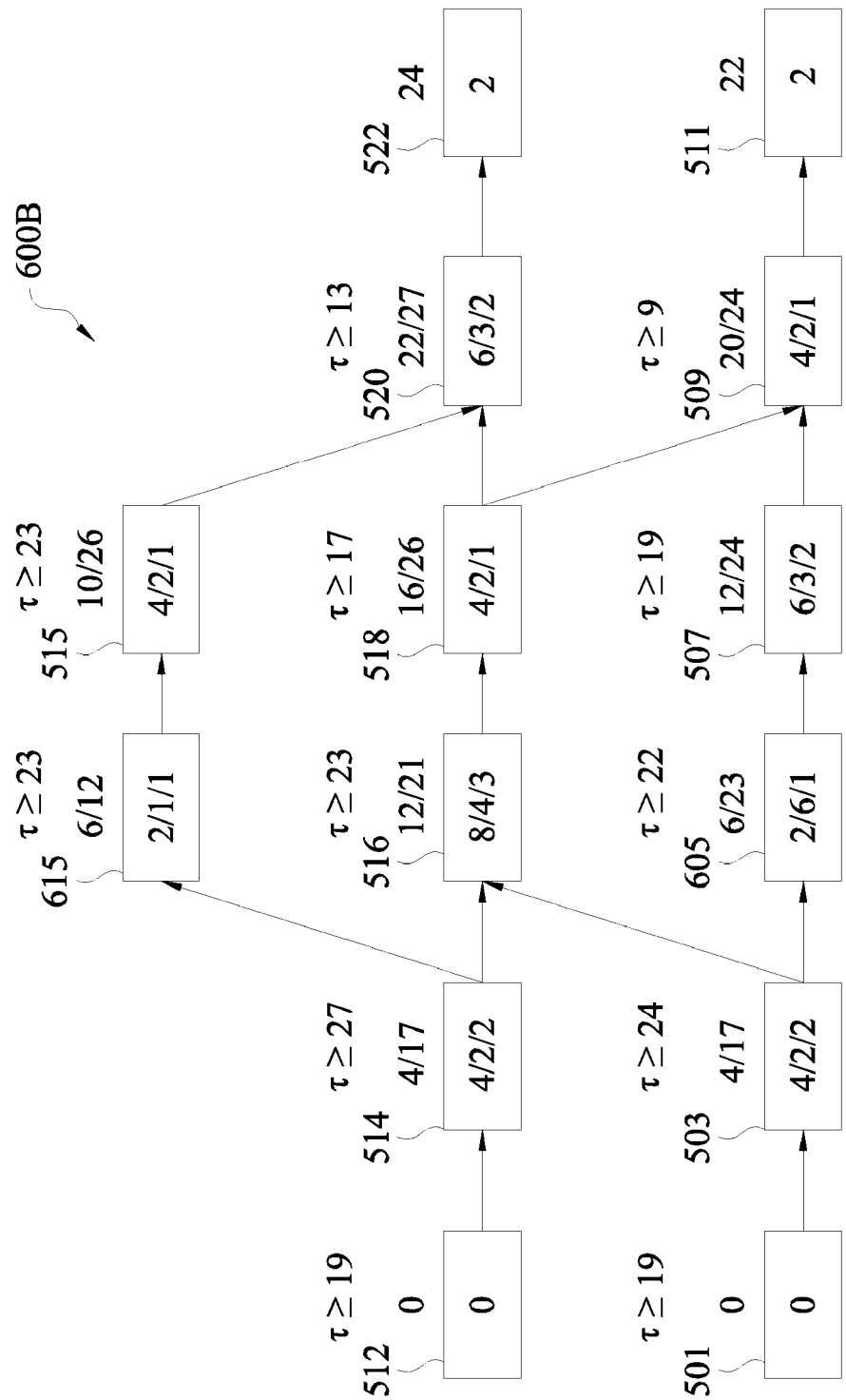

FIG. 6B is a schematic diagrams of a pipeline 600B obtained by performing an area recovery operation 180 (FIG. 1) on the pipeline 600A after the slack matching operation 170, in accordance with some embodiments. The area recovery operation 180 utilizes the result of the re-executed performance analysis after the slack matching operation 170. As indicated in FIG. 6A, among the three signal paths, namely the upper path via buffer 615 and node 515, the middle path via node 516 and node 518, and a lower path via a node 505 and node 507, the lower path is less critical or non-critical, because the maximum cycle time of nodes along the lower path, i.e., the cycle time of 22 at node 505, is lower than the other paths.

In at least one embodiment, one of the nodes along the less critical, lower path is replaced with a module configured to perform the same logic function but with a lower area cost, without violating a timing constraint on the overall cycle time of the pipeline. In at least one embodiment, the overall cycle time of the pipeline is unchanged as a result of the module replacement. In at least one embodiment, as a result of the module replacement, the overall cycle time of the pipeline increases, without exceeding the timing constraint on the overall cycle time of the pipeline. In at least one embodiment, the replaced module and the replacing module are configured to perform the same logic function. In at least one embodiment, the replaced module and the replacing module are configured to perform different logic functions, provided that the overall logic function of the pipeline is unchanged by the module replacement. In the specific example illustrated in FIG. 6B, node 505 which is a PCHB module is replaced with node 605 which is a WCHB module with lower area cost than the PCHB module at node 505. The performance analysis is re-executed as described herein with respect to FIG. 6A, to update the cycle times for the modified path. Because the WCHB module of node 605 is slower than the PCHB module of node 505 being replaced, it is likely that the cycle time of one or more nodes along the modified path increases. For examples, the cycle time of node 507 increases from 19 in the pipeline 600A to 20 in the pipeline 600B. Such an increase is acceptable, because it is still smaller than the overall cycle time of 24 of the whole pipeline. In some embodiments, one or more non-critical PCHB modules or other types of modules having high area cost are replaced with the corresponding WCHB modules or other types of modules having low area cost until such replacement is not possible without violating one or more performance constraints and/or timing constraints on the overall cycle time of the pipeline. The described area recovery operation 180 is an example. Other techniques for reducing the area cost of the chip are within the scope of various embodiments. In some embodiments, one or both of the slack matching operation 170 and area recovery operation 180 is/are omitted. In some embodiments, the area recovery operation 180 is performed before or independently of the slack matching operation 170. The result of the technology-dependent optimization 160 is an optimized circuit design 190 which meets various timing constraints and has reduced area cost.

Figure 7:
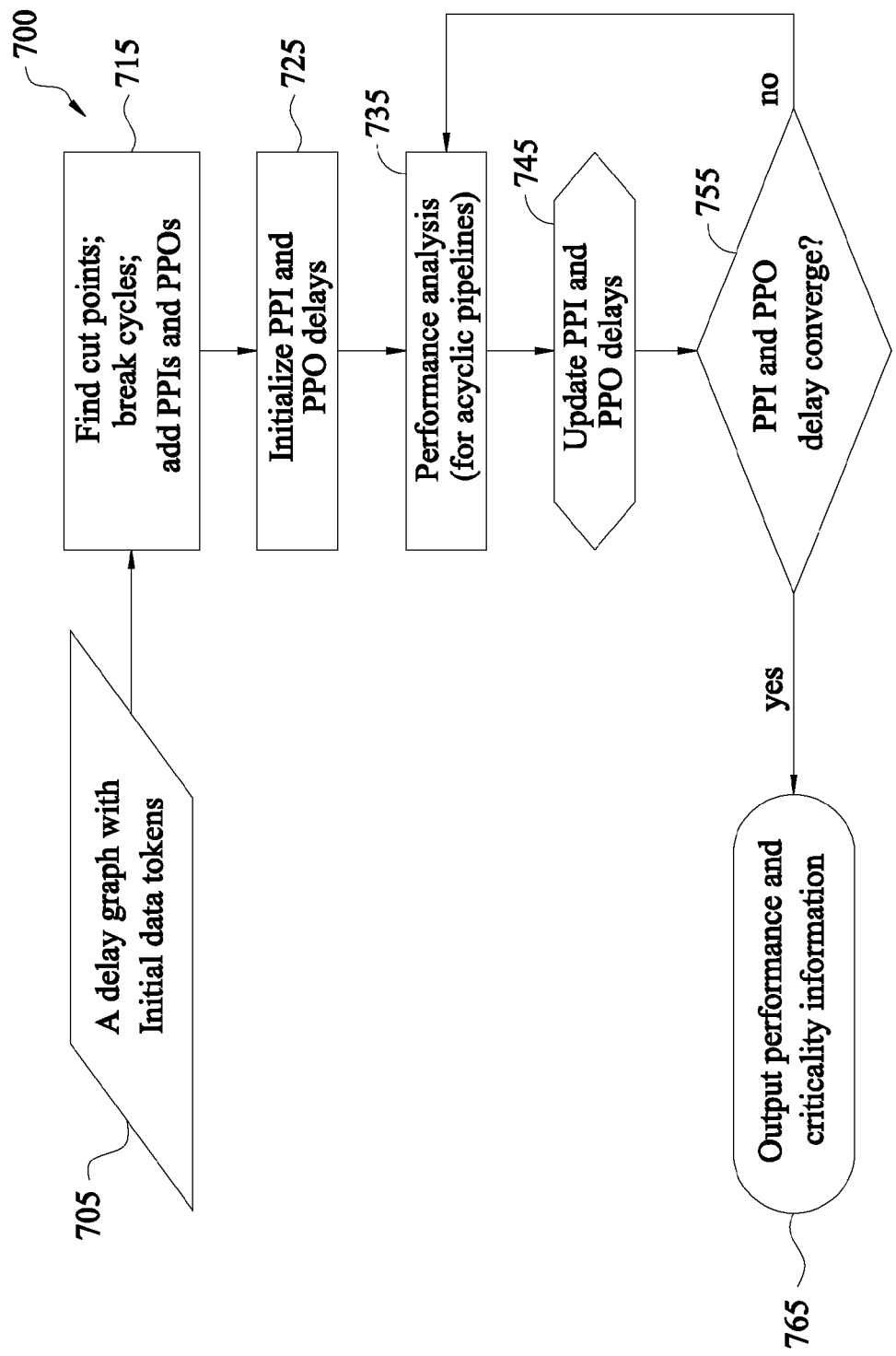
FIG. 7 is a flow chart of a method for conducting a performance analysis for a cyclic pipeline in accordance with some embodiments.

FIG. 7 is a flow chart of the method 700 for conducting a performance analysis for a cyclic pipeline, in accordance with some embodiments. The performance analysis 150 explained with respect to FIGS. 5A-5C is for an acyclic pipeline. The method 700 adapts the explained acyclic technique to handle cyclic pipeline. A delay graph 705 with initial data tokens is used as an input for the performance analysis in the method 700. At operation 715, one or more cut points are identified along the cyclic pipeline, based on positions of the initial data tokens. At operation 725, one or more cuts are made at the cut points, and then a pseudo primary input (PPI) and a pseudo primary output (PPO) are defined for every cut point. The cyclic pipeline transforms into one or more acyclic pipelines. PPIs are initialized to have a token producing delay of 0, and PPOs are initialized to have a token consuming delay 0. At operation 735, a performance analysis is conducted for the transformed one or more acyclic pipelines in the manner described with respect to FIGS. 5A-5C. A result of the performance analysis includes cycle time s and latencies at the nodes in the acyclic pipeline(s). At operation 745, the token producing delays of PPIs and the token consuming delays of PPOs are updated based on the computed cycle times and latency information. At operation 755, it is determined whether the PPI token producing delays and PPO token consuming delays converge. If no, the process returns to operations 735 and 745 to conduct a performance analysis and update the PPI token producing delays and PPO token consuming delays. If yes, performance and criticality information is outputted for a subsequent process, such as the technology-dependent optimization 160. Operations 735 and 745 are performed until convergence of the PPI token producing delays and PPO token consuming delays is achieved. In at least one embodiment, such convergence is guaranteed, because the PPI token producing delays and PPO token consuming delays increase monotonically and are bounded from above by the relationship that t of each node in the acyclic pipeline is not greater than the overall cycle time t of the pipeline, as described herein.

FIG. 8 is a block diagram of a computer system 800 in accordance with some embodiments. One or more of the tools and/or engines and/or systems and/or operations described with respect to FIGS. 1-7 is realized in some embodiments by one or more computer systems 800 of FIG. 8. The system 800 comprises at least one processor 801, a memory 802, a network interface (I/F) 806, a storage 810, an input/output (I/O) device 808 communicatively coupled via a bus 804 or other interconnection communication mechanism.

The memory 802 comprises, in some embodiments, a random access memory (RAM) and/or other dynamic storage device and/or read only memory (ROM) and/or other static storage device, coupled to the bus 804 for storing data and/or instructions to be executed by the processor 801, e.g., kernel 814, userspace 816, portions of the kernel and/or the userspace, and components thereof. The memory 802 is also used, in some embodiments, for storing temporary variables or other intermediate information during execution of instructions to be executed by the processor 801.

In some embodiments, a storage device 810, such as a magnetic disk or optical disk, is coupled to the bus 804 for storing data and/or instructions, e.g., kernel 814, userspace 816, etc. The I/O device 808 comprises an input device, an output device and/or a combined input/output device for enabling user interaction with the system 800. An input device comprises, for example, a keyboard, keypad, mouse, trackball, trackpad, and/or cursor direction keys for communicating information and commands to the processor 801. An output device comprises, for example, a display, a printer, a voice synthesizer, etc. for communicating information to a user.

In some embodiments, one or more operations and/or functionality of the tools and/or engines and/or systems described with respect to FIGS. 1-7 are realized by the processor 801, which is programmed for performing such operations and/or functionality. In some embodiments, the processor 801 is configured as specifically configured hardware (e.g., one or more application specific integrated circuits (ASICs)). One or more of the memory 802, the I/F 806, the storage 810, the I/O device 808, the hardware components 818, and the bus 804 is/are operable to receive instructions, data, design constraints, design rules, netlists, layouts, models and/or other parameters for processing by the processor 801.

In some embodiments, the operations and/or functionality are realized as functions of a program stored in a non-transitory computer readable recording medium. In at least one embodiment, the operations and/or functionality are realized as functions of a program, such as a set of executable instructions, stored in memory 802. In at least one embodiment, a cell library, such as the cell library 140, is stored in a non-transitory computer readable recording medium for access by one or more operations as described herein. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

In some embodiments, a hybrid module with a WCHB module design and a completion detection circuit is provided. Such a hybrid module takes advantage of high performance of PCHB modules and low area cost of WCHB modules. As a result, in at least one embodiment, the area overhead of QDI asynchronous circuits is reduced, which, in turn, alleviates the performance and power overheads.

In some embodiments, one or more SDC conditions are considered in a technology mapping operation for a network of dual-rail modules. Coupled with NP-equivalence consideration and the ability to independently optimize onsets and offsets of dual-rail modules, the technology mapping using SDC conditions in at least one embodiment permits logic simplification with high flexibility and reduced cell library size.

In some embodiments, a static performance analysis is provided for four-phase pipelines, both cyclic and acyclic, for a fast and cost-effective solution compared with other approaches using a dynamic analysis or linear programming based solving. In at least one embodiment, slack matching and/or area recovery is/are performed for performance improvement and/or area cost reduction.

In some embodiments, a logic circuit comprises at least one first input, at least one second input, an output, an input acknowledgement node configured to be coupled to a next logic stage, an output acknowledgement node configured to be coupled to a previous logic stage, a logic evaluation block, a pre-charging circuit, and a completion detection circuit. The logic evaluation block is coupled to the at least one first input, the at least one second input, and the output. The logic evaluation block is configured to perform a logic evaluation of first and second input signals at the corresponding at least one first input and at least one second input, and to output an output signal corresponding to a result of the logic evaluation. The pre-charging circuit is coupled to the at least one first input, the input acknowledgement node, and the logic evaluation block. The pre-charging circuit is configured to pre-charge the logic evaluation block in response to the first input signal and a next stage acknowledgement signal at the input acknowledgement node. The completion detection circuit is coupled to the at least one second input, the output, and the output acknowledgement node. The completion detection circuit is configured to generate a previous stage acknowledgement signal at the output acknowledgement node in response to the second input signal and the output signal.

In some embodiments, a system comprises at least one processor configured to perform a technology mapping to map logic elements in a logic netlist to corresponding dual-rail modules in a library. The technology mapping results in a network of interconnected nodes, the mapped dual-rail modules arranged at the corresponding nodes of the network. The processor is configured to perform an optimization of the network. The processor is configured to perform the technology mapping based on at least one SDC condition.

In some embodiments, a computer program product comprises a non-transitory, computer-readable medium containing instructions therein which, when executed by at least one processor, cause the at least one processor to perform a performance analysis of a network of interconnected nodes, the nodes configured to perform corresponding logic functions. The performance analysis comprises, for each of the nodes in a pipeline in the network, calculating an evaluation finish time of said node based on the evaluation finish time of a fanin node of said node, and an evaluation time parameter of the module at said node. The performance analysis comprises calculating a pre-charging finish time of said node based on the evaluation finish time of a fanout node of said node, an acknowledge output time parameter of the module at the fanout node, the evaluation finish time of the fanin node of said node, an acknowledge output time parameter of said node, the evaluation finish time of said node, and a pre-charging time parameter of the module at said node. The performance analysis further comprises calculating a cycle time of said node based on the pre-charging finish time and the acknowledge output time parameter of the fanout node, and the evaluation finish time of the fanin node.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A logic circuit, comprising:
   at least one first input;
   at least one second input;
   an output;
   an input acknowledgement node configured to be coupled to a next logic stage;
   an output acknowledgement node configured to be coupled to a previous logic stage;
   a logic evaluation block coupled to the at least one first input, the at least one second input, and the output,
      the logic evaluation block configured to perform a logic evaluation of first and second input signals at the corresponding at least one first input and at least one second input, and to output an output signal corresponding to a result of the logic evaluation;
   a pre-charging circuit coupled to the at least one first input, the input acknowledgement node, and the logic evaluation block,
      the pre-charging circuit configured to pre-charge the logic evaluation block in response to the first input signal and a next stage acknowledgement signal at the input acknowledgement node; and
   a completion detection circuit coupled to the at least one second input, the output, and the output acknowledgement node,
      the completion detection circuit configured to generate a previous stage acknowledgement signal at the output acknowledgement node in response to the second input signal and the output signal.

2. The logic circuit of claim 1, wherein the pre-charging circuit is configured to pre-charge the logic evaluation block irrespective of the second input signal.

3. The logic circuit of claim 1, wherein the pre-charging circuit is configured to
   pre-charge the logic evaluation block in response to a NULL state of the first input signal and a first logic state of the next stage acknowledgement signal, and
   stop pre-charging the logic evaluation block in response to at least one of a DATA state of the first input signal or a second logic state of the next stage acknowledgement signal, the second logic state different from the first logic state.

4. The logic circuit of claim 1, wherein the completion detection circuit is configured to
   set the previous stage acknowledgement signal at a first logic state in response to NULL states of the output signal and the second input signal, and
   set the previous stage acknowledgement signal at a second logic state in response to a DATA state of the output signal, the second logic state different from the first logic state.

5. The logic circuit of claim 1, wherein the completion detection circuit comprises:
   a transistor string of serially connected first through fourth transistors, the transistor string having opposite first and second ends, the first end of the transistor string coupled to a first power supply node, the second end of the transistor string coupled to the output acknowledgement node,
  a gate terminal of the first transistor coupled to a first rail of the at least one second input,
  a gate terminal of the second transistor coupled to a second rail of the at least one second input,
  a gate terminal of the third transistor coupled to a first rail of the output, and
  a gate terminal of the fourth transistor coupled to a second rail of the output; and
fifth and sixth transistors coupled between the second end of the transistor string and a second power supply node,
  a gate terminal of the fifth transistor coupled to the first rail of the output, and
  a gate terminal of the sixth transistor coupled to the second rail of the output.

6. The logic circuit of claim 1, wherein the pre-charging circuit, the logic evaluation block, the at least one first input, and the output define a Weak Conditioned Half Buffer (WCHB) circuit with partial pre-charge completion detection.

7. A logic circuit, comprising:
an input completion detector coupled to at least a first input node and a second input node, and configured to detect a state of a first input signal at the first input node;
an output completion detector coupled to an output node and configured to detect a state of an output signal at the output node;
a completion detection circuit coupled to an output acknowledgement node, wherein the completion detection circuit is configured to generate at the output acknowledgement node a DATA state signal if the state of the first input signal is DATA and the state of the output signal is DATA, and to generate at the output acknowledgement node a NULL state signal if the state of the first input signal is NULL, wherein the completion detection circuit is configured to generate the NULL state signal at the output acknowledgement node if the state of the first input signal is NULL irrespective of a state of a second input signal at the second input node.

8. The logic circuit of claim 7 wherein the completion detection circuit is configured to generate the NULL state signal at the output acknowledgement node if the state of the output signal is NULL.

9. The logic circuit of claim 7 further comprising:
an input acknowledgement node configured to be coupled to a next logic stage; and
a pre-charging circuit configured to pre-charge a logic evaluation block in response to an input acknowledgement signal at the input acknowledgement node.

10. The logic circuit of claim 9 wherein the pre-charging circuit comprises:
a first P-channel metal-oxide semiconductor (PMOS) transistor;
a second PMOS transistor;
a third PMOS transistor; and
a fourth PMOS transistor, wherein
a gate terminal of the first PMOS transistor is coupled to a gate terminal of the second PMOS transistor, and
a gate terminal of the third PMOS transistor is coupled to a gate terminal of the fourth PMOS transistor.

11. The logic circuit of claim 10 wherein the gate terminals of the first and second PMOS transistors are coupled to the output acknowledgement node, and the gate terminals of the third and fourth PMOS transistors are coupled to the input acknowledgement node.

12. The logic circuit of claim 7 further comprising:
a logic evaluation block coupled to the first input node, the second input node, a third input node, and a fourth input node, wherein
the first input node is coupled to a gate of a first N-channel metal-oxide semiconductor (NMOS) transistor, and
the second input node is coupled to a gate of a second NMOS transistor, wherein a drain of the first NMOS transistor is coupled to a drain of the second NMOS transistor, and wherein at least one of the first input node, second input node, third input node, and fourth input node is coupled to the input completion detector.

13. The logic circuit of claim 12 wherein the logic evaluation block is electrically connected to a reference supply terminal through a third NMOS transistor coupled in series with a fourth NMOS transistor.

14. The logic circuit of claim 13 wherein the third NMOS transistor is coupled to the output acknowledgement node.

15. The logic circuit of claim 14 wherein the fourth NMOS transistor is coupled to an input acknowledgement node configured to be coupled to a next logic stage.

16. A logic circuit, comprising:
an input acknowledgement node configured to be coupled to a next logic stage;
an output acknowledgement node configured to be coupled to a previous logic stage;
a pre-charging circuit coupled to the input acknowledgement node and a logic evaluation block, the pre-charging circuit configured to pre-charge the logic evaluation block in response to a first input signal and a next stage acknowledgement signal at the input acknowledgement node; and
a completion detection circuit coupled to the output acknowledgement node,
the completion detection circuit configured to generate a previous stage acknowledgement signal at the output acknowledgement node in response to a second input signal and an output signal, wherein the completion detection circuit comprises a transistor string of serially connected first through fourth transistors, the transistor string having opposite first and second ends, the first end of the transistor string coupled to a first power supply node, the second end of the transistor string coupled to the output acknowledgement node.

17. The logic circuit of claim 16 wherein the pre-charging circuit comprises:
a first P-channel metal-oxide semiconductor (PMOS) transistor;
a second PMOS transistor;
a third PMOS transistor; and
a fourth PMOS transistor, wherein
a gate terminal of the first PMOS transistor is coupled to a gate terminal of the second PMOS transistor, and
a gate terminal of the third PMOS transistor is coupled to a gate terminal of the fourth PMOS transistor.

18. The logic circuit of claim 17 wherein the gate terminals of the first and second PMOS transistors are coupled to the output acknowledgement node, and the gate terminals of the third and fourth PMOS transistors are coupled to the input acknowledgement node.

19. The logic circuit of claim 16 further comprising:
a logic evaluation block coupled to a first input node, a second input node, a third input node, and a fourth input node, wherein the first input node is coupled to a gate of a first N-channel metal-oxide semiconductor (NMOS) transistor, and the second input node is coupled to a gate of a second NMOS transistor, wherein a drain of the first NMOS transistor is coupled to a drain of the second NMOS transistor, and wherein at least one of the first input node, second input node, third input node, and fourth input node is coupled to an input completion detector.

20. The logic circuit of claim 19 wherein the logic evaluation block is electrically connected to a second power supply node through a third NMOS transistor coupled in series with a fourth NMOS transistor.

* * * * *